(12) United States Patent
Matsumoto et al.

(10) Patent No.: US 6,230,971 B1
(45) Date of Patent: May 15, 2001

(54) TRANSACTION-ORIENTED ELECTRONIC ACCOMMODATION SYSTEM

(75) Inventors: Kenji Matsumoto, Yokohama; Shigeyuki Itoh, Kawasaki; Misuzu Nakano, Yokohama; Akira Kanehira, Tokyo; Masaaki Hiroya, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/593,952

(22) Filed: Jun. 15, 2000

Related U.S. Application Data

(63) Continuation of application No. 08/638,591, filed on Apr. 29, 1996, now Pat. No. 6,116,506.

(51) Int. Cl.⁷ .................................................. G06K 5/00
(52) U.S. Cl. ........................................ 235/380; 235/382.5
(58) Field of Search .................................. 235/380, 381, 235/382, 382.5, 492

(56) References Cited

U.S. PATENT DOCUMENTS

| | | |
|---|---|---|
| 3,742,453 | 6/1973 | Poylo . |
| 4,558,175 | 12/1985 | Genest et al. ..................... 235/382.5 |
| 4,677,435 | 6/1987 | D'Agraives et al. ................ 235/382 |
| 4,698,630 | 10/1987 | Ellsberg ............................. 235/382.5 |
| 4,803,348 | 2/1989 | Lohrey et al. . |

(List continued on next page.)

FOREIGN PATENT DOCUMENTS

| | | |
|---|---|---|
| 2563987 | 11/1985 | (DE) . |
| 4304911 | 8/1994 | (DE) . |
| 0205691 | 12/1986 | (EP) . |
| 0234833 | 9/1987 | (EP) . |
| 0387387 | 9/1990 | (EP) . |
| 0410008 | 1/1991 | (EP) . |
| 0531942 | 3/1993 | (EP) . |
| 0704826 | 4/1996 | (EP) . |
| 392966 | 4/1991 | (JP) . |
| 432050 | 2/1992 | (JP) . |
| 546633 | 2/1993 | (JP) . |
| 5504643 | 7/1993 | (JP) . |
| 5287946 | 11/1993 | (JP) . |

OTHER PUBLICATIONS

Zoreda and Oton, "Smart Cards", Artech House, 1994, pp. 139–143 and 155–158.

Payment Technologies, Inc., "Payment Technologies Case Studies" from 1998 *Advanced Card Technology Source Book*, Faulkner & Gray, 1997.

Adams, Russ, "Sourcebook of Automatic Identification and Data Collection", Van Nostrand Reinhold, 1990, p. 155–160.

Primary Examiner—Mark Tremblay
(74) Attorney, Agent, or Firm—Antonelli, Terry, Stout & Kraus, LLP

(57) ABSTRACT

A transaction-oriented electronic accommodation system includes an IC card storing electronic monetary information and an identification number, an IC card read/write unit for reading and/or writing information in/from the IC card, a key control unit for controlling locking and unlocking of a door of the article receiving/housing unit, an identification number storing unit for storing identification number of the IC card, an amount-of-money information storing unit for storing amount-of-money information, a collating unit for collating the identification number stored in the identification number storing unit with the identification number read out from the IC card, and a line control unit for transferring the electronic monetary information via transmission line. For utilizing the article receiving/housing unit, the IC card is inserted, whereby the article receiving/housing unit is locked. For taking out article from the article receiving/housing unit, the IC card is inserted, whereby the article receiving/housing unit is unlocked with the accounting being settled. Cashless transaction can be realized.

21 Claims, 25 Drawing Sheets

U.S. PATENT DOCUMENTS

| | | | |
|---|---|---|---|
| 4,849,614 | 7/1989 | Watanabe et al. .................... | 235/380 |
| 4,857,714 | 8/1989 | Sunyich . | |
| 4,912,310 | 3/1990 | Nomura et al. ....................... | 235/380 |
| 5,196,687 | 3/1993 | Sugino et al. ........................ | 235/483 |
| 5,223,829 | 6/1993 | Watabe .............................. | 235/382.5 |
| 5,225,977 | 7/1993 | Hooper et al. ........................ | 235/381 |
| 5,278,538 | 1/1994 | Ainsworth et al. . | |
| 5,384,454 | 1/1995 | Iijima ................................... | 235/492 |
| 5,446,266 | 8/1995 | Beuk et al. ........................ | 235/382.5 |
| 5,475,378 | 12/1995 | Kaarsoo et al. ..................... | 235/382 |
| 5,591,950 | 1/1997 | Imedio-Ocana ................... | 235/382.5 |

| ROOM NUMBER | PERSONAL ID NUMBER |
|---|---|
| ⋮ | ⋮ |
| ⋮ | ⋮ |
| ⋮ | ⋮ |

TRANSACTION-ORIENTED ELECTRONIC ACCOMMODATION SYSTEM

REFERENCE TO EARLIER FILED APPLICATION(S)

This application is a continuation of the following earlier filed application(s) Ser. No. 08/638,591, filed Apr. 29, 1996, now U.S. Pat. No. 6,116,506.

CROSS-REFERENCE TO RELATED APPLICATION

The application relates to U.S. patent application Ser. No. 08/539,163 filed on Oct. 4, 1995 entitled "SYSTEM AND METHOD FOR CHARGING FEE FOR VIDEO INFORMATION", by Shigeyuki Ito, et al. and assigned to HITACHI, LTD., the disclosure of which is incorporated herein by reference.

BACKGROUND OF THE INVENTION

The present invention relates generally to a transaction-oriented electronic accommodation system such as an electronic home-by-home (or door-to-door) delivery service/reception system, an electronic laundry service/reception system, an IC-card-operated electronic locker system, an IC-card type electronic parking meter system and the like. Such systems are adapted for performing control and management of boxes or compartments or zones destined for accommodating articles in a broadest sense, as well as monetary transactions associated therewith, by making use of an electronic wallet system.

As the transaction-oriented electronic accommodation system of the type mentioned above, there has been proposed in JP-A-3-92966 (Japanese Unexamined Patent Application Publication No. 92966/1991) an electronic money system in which an IC card (integrated-circuit card) is used for realizing commercial transactions in a completely cashless manner (i.e., without involving monetary transactions in cash).

Similar systems are also disclosed in the publications of JP-A-5-287946, JP-A-546633 and JP-A-432050.

SUMMARY OF THE INVENTION

It is an object of the present invention to provide a transaction-oriented electronic accommodation system such as an electronic home-by-home delivery service/reception system, an electronic laundry service/reception system, an IC-card-operated electronic locker system, a parking meter system and the like, in which the principle underlying an electronic money system is made use of. Such allows monetary transactions associated therewith to be performed in a cashless manner using an IC card, while allowing the IC card to also be used as keys for locking and unlocking accommodation units or boxes to thereby render unnecessary all of the management of keys, handling of money and bill collecting.

In view of the above and other objects which will become apparent as the description proceeds, there is provided according to an aspect of the present invention, a transaction-oriented electronic accommodation system which includes an IC card storing electronic monetary information and an identification number. Further, there are included: an IC card read/write unit for reading and/or writing information in/from the IC card, an IC card control unit for controlling loading and discharge of the IC card into/from the accommodation system, an article receiving/housing unit such as a box for accommodating therein an article, a key control unit for controlling locking and unlocking of a door of the article receiving/housing unit, an identification number storing unit for storing the identification number of the IC card, an amount-of-money information storing unit for storing amount-of-money information, a collating unit for collating the identification number stored in the identification number storing unit with the identification number read out from the IC card, and a line control unit for transferring the electronic monetary information with a centralized management unit via transmission line or channel.

Upon accommodation of an article within the article receiving/housing unit such as a box, a compartment, a zone or the like, the identification number read out from the IC card is stored in the identification number storing unit, and the door of the article receiving/housing unit is locked under the control of the key control unit. Further, upon taking out of the article from the article receiving/housing unit, the door thereof is unlocked by the key under the control of the key control unit, only when coincidence is found by the collating unit between the identification number stored in the identification number storing incorporated in the system unit and the identification number read out from the IC card as inserted. Furthermore, upon taking out of the article from the article receiving/housing unit, the amount of money to be charged for utilization of the accommodation system is subtracted from deposit money recorded in the IC card by means of the IC card read/write unit. A corresponding amount-of-money information is then sent to the centralized management unit such as a management center via a transmission line such as a telephone circuit, only when monetary information is stored in the monetary information storing unit.

By applying the principle underlying the electronic money system to the transaction-oriented electronic accommodation system such as a locker system, a home-by-home delivery system and others, the article receiving/housing unit can be locked upon starting the use thereof in dependence on the ID number of the IC card as inserted. Similarly, taking out the article from the article receiving/housing unit, unlocking of the article receiving/housing unit and the accounting settlement processing are performed simply by inserting the IC card in the transaction-oriented electronic accommodation system. Similar advantageous effects can be realized in the locker system as well. Thus, the user of the transaction-oriented electronic accommodation system can get rid of a burden for managing the key for unlocking the article receiving/housing unit, while allowing the accounting to be settled at the same time even when payment upon reception of the article is required. Thus, transaction can be realized in the cashless manner (i.e., without involving monetary transactions in cash).

In the transaction-oriented electronic accommodation system according to another aspect of the present invention, an IC card is used as a substitute means for payment in cash by writing the monetary information (amount-of-money information) in the IC card, while the ID information recorded in the IC card is made use of for locking and unlocking the article receiving/housing unit such as a box, compartment or the like. To this end, the transaction-oriented electronic accommodation system is comprised of a unit for reading out the ID information from the IC card as inserted, a unit for storing the ID information, a unit for controlling locking/unlocking of the article receiving/housing unit, a unit for storing the ID information, a unit for controlling the locking/unlocking key by collating the input ID information with the stored ID information, a unit for measuring a time, a unit for calculating an amount of money to be charged on the basis of the information concerning the time as measured, a unit for rewriting or updating the monetary information recorded in the IC card in dependence of the amount-of-money information as charged, and a unit for transferring the monetary information with a center for centralized management.

With the arrangement of the transaction-oriented electronic accommodation system described above, the IC card carrying the monetary information and the ID information can be used in association with the article receiving/housing unit. Thus, the transaction-oriented electronic accommodation system can be utilized even when the user has no money in cash or no coins. Besides, utilization of the transaction-oriented electronic accommodation system can be realized satisfactorily for the user even in the case where the transaction-oriented electronic accommodation system or the article receiving/housing unit is used only for a short time, because the fee as charged is calculated on the basis of the time for which the system has been utilized.

Thus, with the arrangement of the transaction oriented electronic accommodation system according to the present invention, the facilities or services which require instantaneous settlement of the accounting for the utilization as well as identification of the user can be realized without need for monetary transaction in cash, to great advantages.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
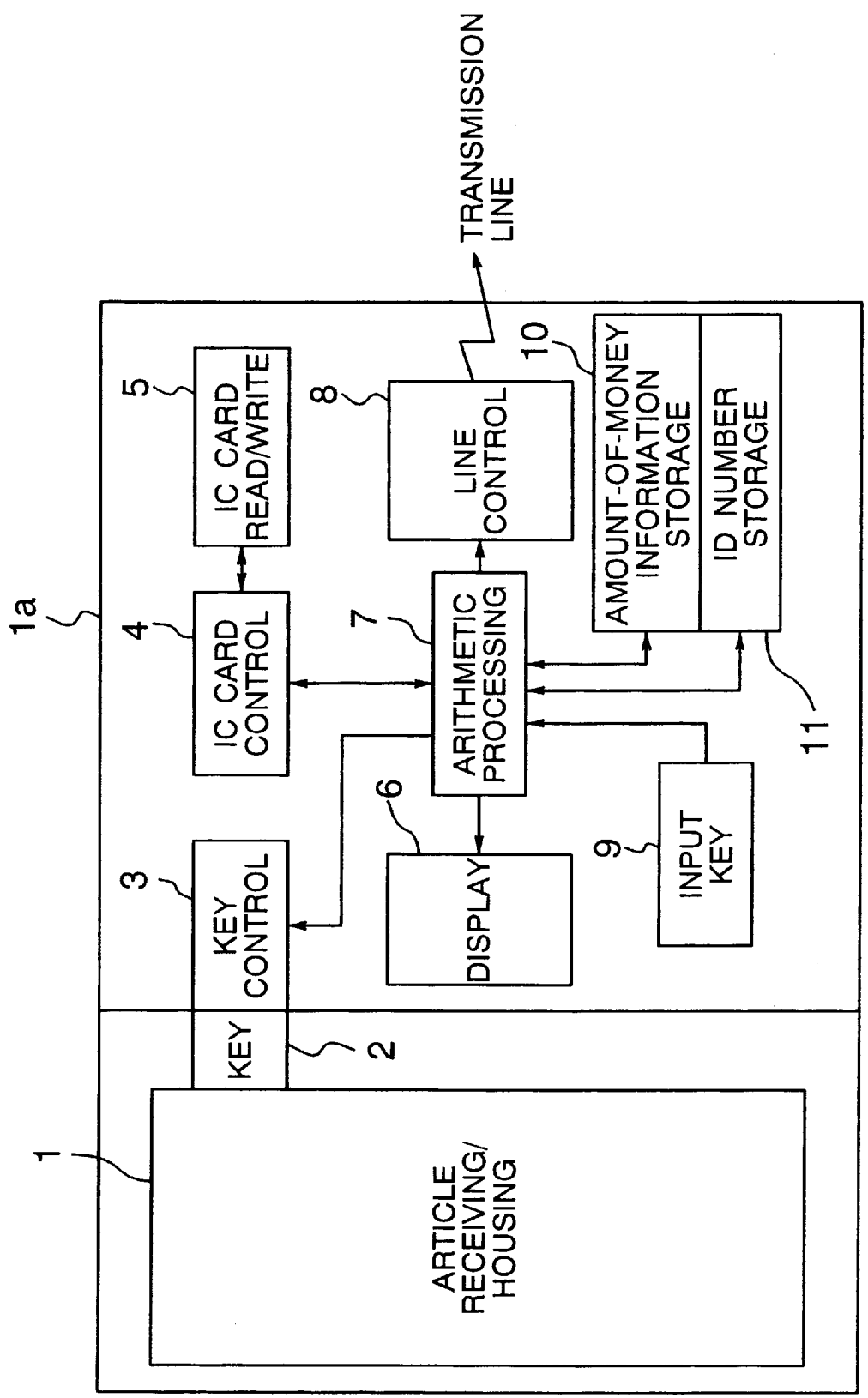
FIG. 1 is a block diagram showing a general arrangement of an electronic home-by-home (or door-to-door) delivery service/reception system as an application of a transaction-oriented electronic accommodation system according to an embodiment of the present invention.

The present invention will be described in detail in conjunction with what is presently considered as preferred or typical embodiments and applications thereof by reference to the drawings. In the following description, like reference characters designate like or corresponding parts throughout the several views.

Now, referring to FIGS. 1 to 10, description will be made of a transaction-oriented electronic accommodation system according to an exemplary embodiment of the invention. More specifically, the instant embodiment of the invention is directed to an electronic home-by-home (or door-to-door) delivery/reception system, which is one of typical applications which the transaction-oriented electronic accommodation system according to the invention is applicable. FIG. 1 shows in a block diagram, a general arrangement of the electronic home-by-home (or door-to-door) delivery service/reception system. In the figure, reference character 1a designates generally the transaction-oriented electronic accommodation system applied to an electronic delivery service/reception system, 1 denotes an article receiving/housing unit, 2 denotes a key, 3 denotes a key control unit, 4 denotes an IC card control unit, 5 denotes an IC card read/write unit, 6 denotes a display unit, 7 denotes an arithmetic processing unit, 8 denotes a line control unit, 9 denotes an input key, 10 denotes an amount-of-money information storage unit, and numeral 11 denotes an ID number storage unit.

Figure 2:
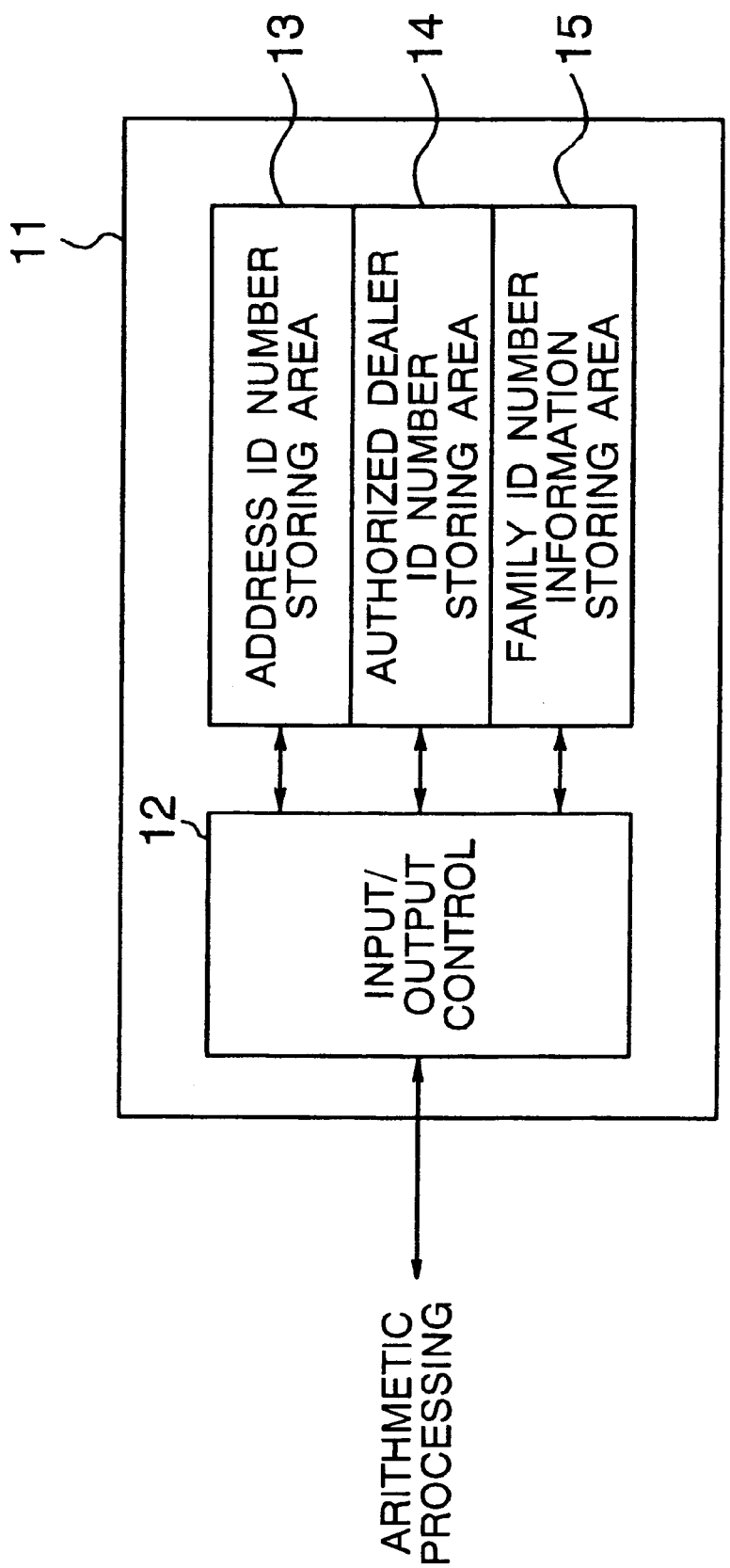
FIG. 2 is a block diagram showing a structure of an ID number storage unit incorporated in the system.
Figures 3, 4:
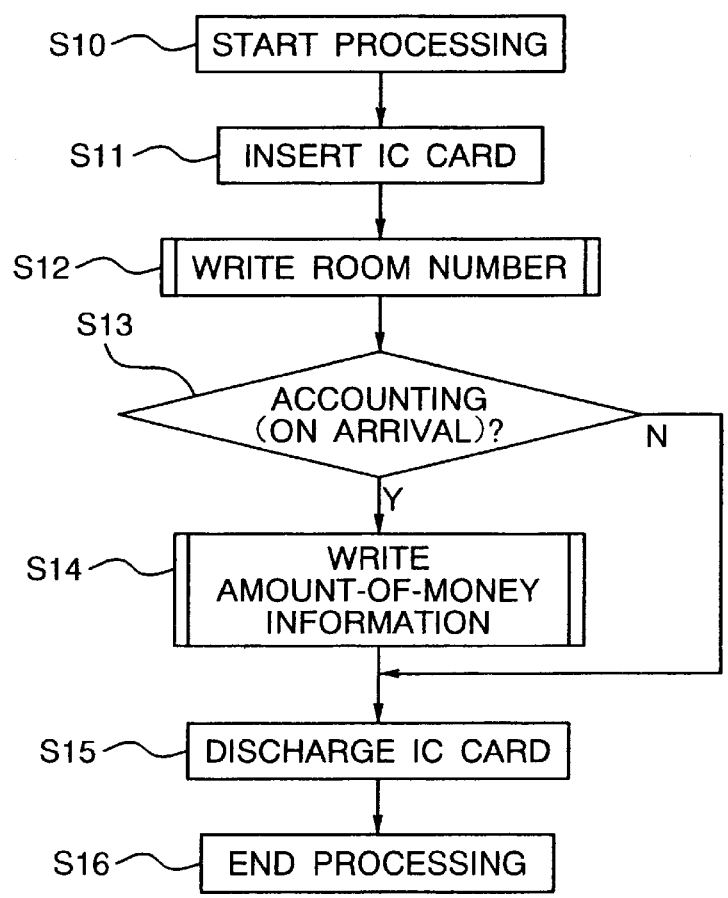
FIG. 3 is a view for illustrating a structure of a family ID number information storing area used in the system shown in FIG. 1.
FIG. 4 is a flow chart for illustrating operation of the electronic home-by-home delivery service/reception system.

FIG. 2 is a block diagram showing, by way of example only, a structure of the ID number storage unit 11. As can be seen in the figure, the ID number storage unit 11 is comprised of an input/output control unit 12, a receiver (addressee) ID number storing area 13, an authorized dealer ID number storing area 14, and a family ID number information storing area 15. The receiver ID number storing area 13 is destined for storing the ID number (identification number) of a receiver or destination for an article to be delivered. However, so long as the article receiving/housing unit 1 remains empty, none is stored in the receiver ID number storing area 13. On the other hand, the authorized dealer ID number storing area 14 is destined for storing the ID number of the authorized dealer, in order to ensure that only the authorized dealer or deliveryman can place or put an article or articles in the article receiving/housing unit 1. Further, the family ID number information storing area 15 is destined to store the ID numbers of IC cards carried by individuals resident in separate rooms, of one and the same building. FIG. 3 shows, by way of example, a structure of the family ID number information storing area 15.

At first, the concept or principle of the invention underlying the transaction-oriented electronic accommodation system applied to the electronic delivery service/reception system 1a will be described in general. It is assumed that the electronic delivery service/reception system 1a of concern is usually installed at an entrance of a collective house building such as, for example, an apartment house, a so-called mansion or the like. A deliveryman puts an article or articles in the article receiving/housing unit 1 and locks it by using the key 2. On the other hand, the receiver or addressee can open the article receiving/housing unit 1 by using his or her own key 2, to thereby take out the article(s) from the article receiving/housing unit 1. Thus, the electronic delivery service/reception system 1a allows the deliveryman to deliver article or articles even when the addressee or receiver(s) is absent, and is very advantageous for the delivery of article(s) or goods to the houses which are prone to be unoccupied in the daytime, such as student's residences, dual-income families or the like. Additionally, by adopting the electronic home-by-home (or door-to-door) delivery service/reception system, the ID number of the IC card can be made use of as the key 2 for the electronic delivery service/reception system 1a. In addition, the accounting as involved can be easily settled by making use of soled electronic money when it is required upon reception of the article as delivered. In the case of the system shown in FIG. 1, it is assumed that a plurality of electronic delivery service/reception systems 1a are provided for each of the collective house building or apartment house and the like, and that the addressee can receive the delivered article by using freely any one of the electronic delivery service/reception systems 1a. It should, however, be appreciated that the electronic delivery service/reception system 1a may be installed in one-to-one correspondence with respect to a home or family.

FIG. 4 is a flow chart for illustrating operation performed by a deliveryman for the door-to-door delivery service by using his or her electronic wallet in association with delivering an article.

When the deliveryman unlocks the article receiving/housing unit 1 of the electronic delivery service/reception system 1a by using his or her own IC card, it is required for the deliveryman to register the information about the addressee or receiver of an article for delivery and information-concerning the amount of money when the accounting has to be settled upon transfer of the article. Accordingly, the deliveryman inserts his or her own IC card into the electronic wallet before delivery (step S11), to thereby allow the room number of the addressee or destination for the delivery to be written in the IC card (step S12). Further, when the settlement of the amount of money charged for the delivery is required upon transfer of the article (step S13), the deliveryman is required to write the information about the amount of money in the IC card (step S14). In this conjunction, it is presumed that the information as to the room numbers of all the addressees and the information concerning the amounts of money to be charged are stored in the electronic wallet, and then with manipulation of the input key 9 by the deliveryman, the information as to the room number of the addressee who is to receive next an article as well as the information about the amount of money to be charged, is stored in a memory incorporated in the IC card.

Upon completion of writing of the information mentioned above in the IC card carried by the deliveryman, the IC card is discharged from the electronic wallet (step S15), whereupon the processing comes to an end (step S16).

At this juncture, it should be mentioned that the delivery slip (i.e., slip for the delivery) itself may be an IC card. In that case, the deliveryman can get rid of the burden for writing the information concerning the room number of the addressee as well as the amount of money to be charged upon every delivery.

Figure 5:
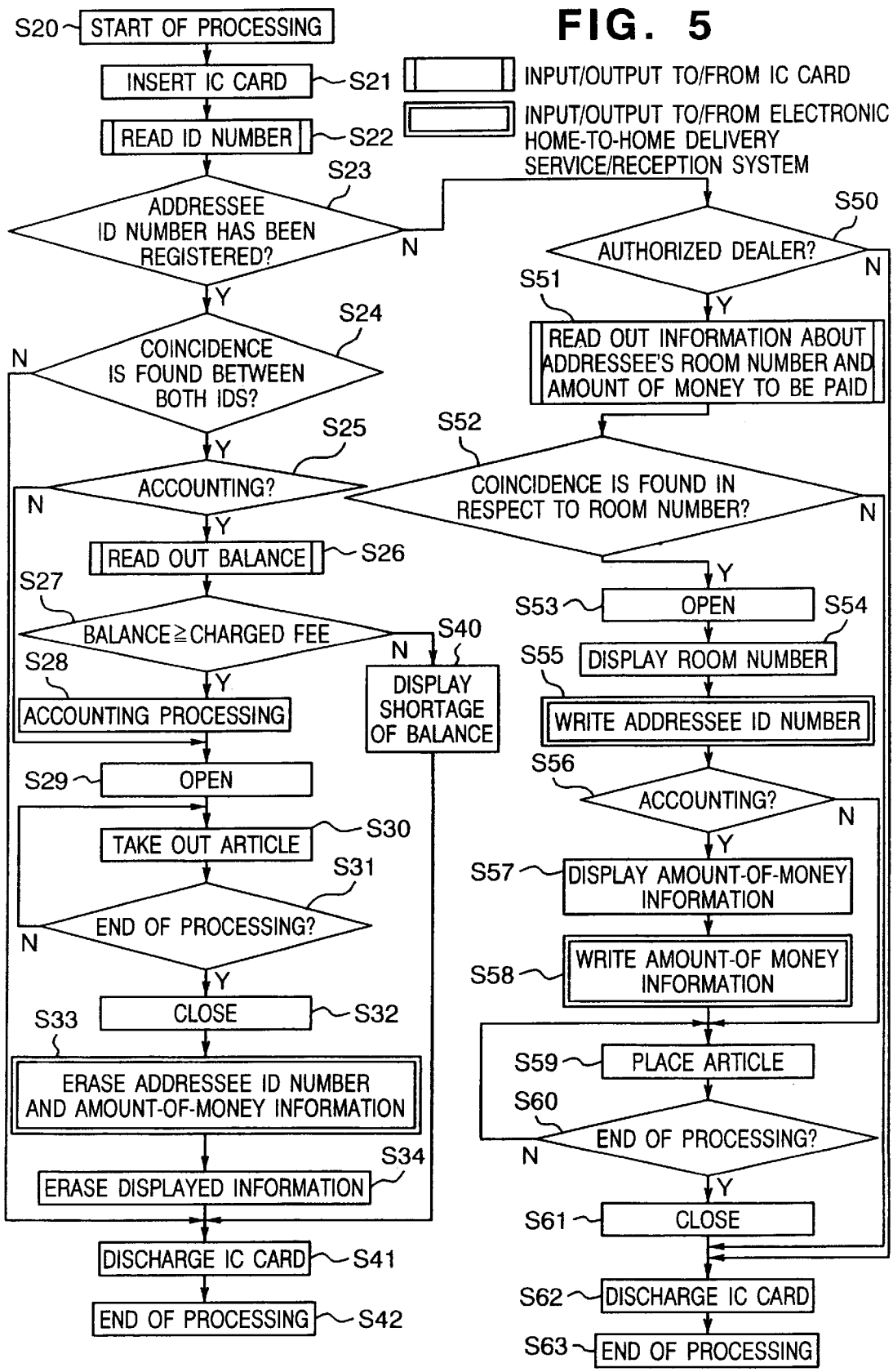
FIG. 5 is a /flow chart for illustrating operations of the electronic home-by-home delivery service/reception system according to an embodiment of the present invention.
Figure 6:
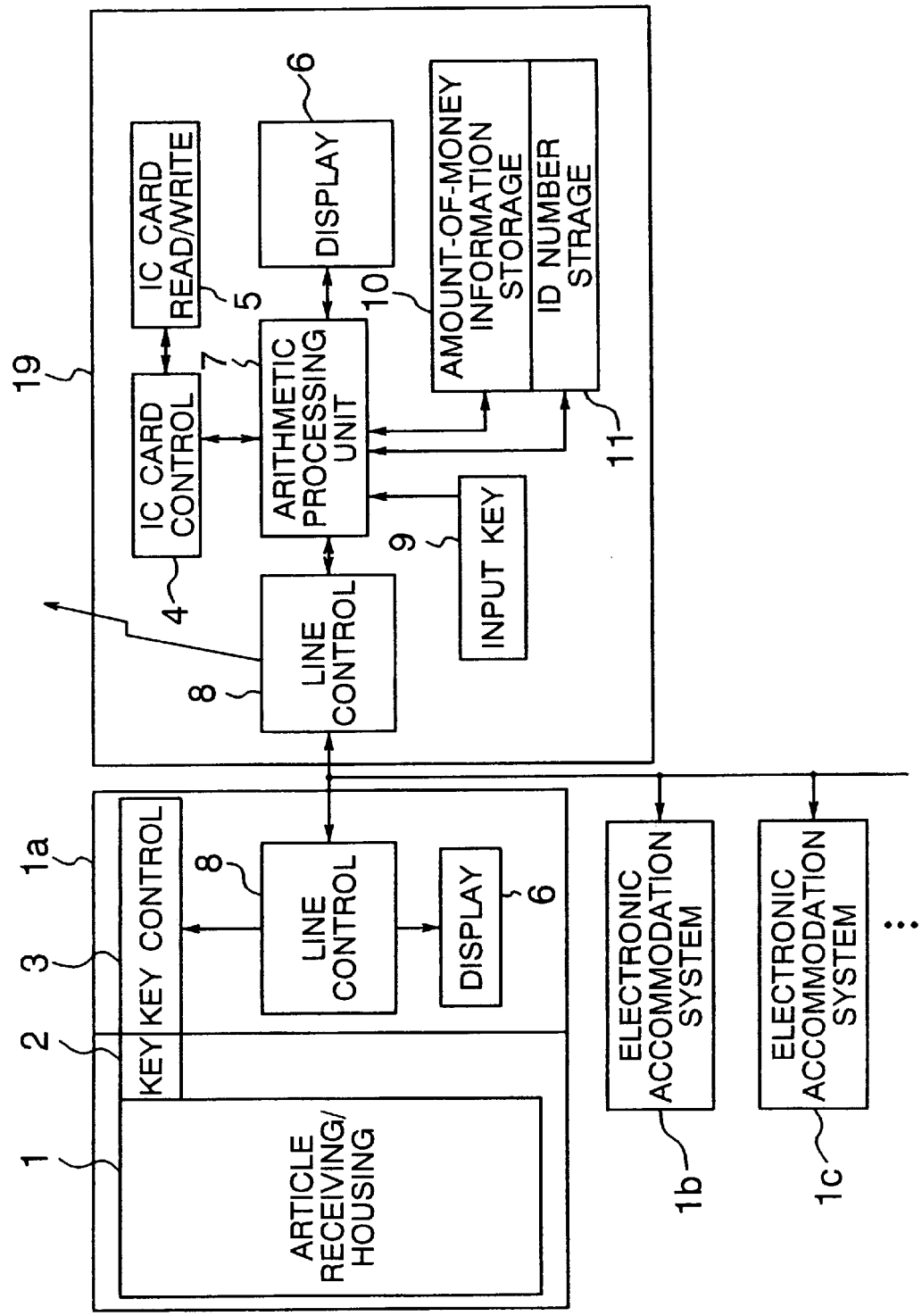
FIG. 6 is a block diagram showing a general arrangement of an electronic home-by-home (or door-to-door) delivery service/reception system implemented by applying a transaction-oriented electronic accommodation system according to another embodiment of the present invention.

After the operation described above, the deliveryman places the article concerned in the article receiving/housing unit 1 of the electronic delivery service/reception system 1a shown in FIG. 1, and locks the system by using the key 2. Later on, the addressee can receive the article by opening the electronic delivery service/reception system 1a by using the key 2. FIG. 5 is a flow chart for illustrating the processing performed by an addressee upon receiving an article destined to him or her from the electronic delivery service/reception system 1a.

At first, description will be directed to operation required for the deliveryman to place an article into the article receiving/housing unit 1 of the electronic delivery service/reception system 1a. When the deliveryman inserts his or her IC card in a card receiving slot of the electronic delivery service/reception system 1a (step S21), the IC card is fed into the system 1a under the control of the IC card control unit 4. Subsequently, the ID number of the IC card as inserted is read out by the IC card read/write unit 5, whereupon the relevant ID information is supplied to the arithmetic processing unit 7 (step S22). The arithmetic processing unit 7 then checks whether or not the ID number of the addressee who is duly to receive the article is stored in the addressee ID number storing area 13 (step S23). Unless the ID number of the addressee is stored in the addressee ID number storing area 13, this means that the article receiving/housing unit 1 is empty. In that case, the processing branches to a routine illustrated at a right-hand side of FIG. 5 for allowing the deliveryman to place the article in the article receiving/housing unit 1.

Subsequently, it is checked in a step S50 whether or not the ID number of the IC card carried by the deliveryman is registered in the authorized dealer ID number storing area 14. When it is confirmed in the step S50 that the deliveryman is an authorized dealer, the processing proceeds to a succeeding step. On the other hand, when it is found that the deliveryman is not the authorized dealer, the IC card is rejected or discharged from the electronic delivery service/reception system 1a, making it impossible for the deliveryman to place the article in the article receiving/housing unit 1. Owing to the processing routine described above, it is only the authorized dealer or deliveryman that can place the article in the article receiving/housing unit 1. Thus, security of the article receiving/housing unit 1 and hence the electronic delivery service/reception system 1a can positively be ensured with high reliability.

Now, it is assumed that the deliveryman is the authorized dealer, information about the room number of the addressee duly to receive the article (which information is stored in the memory of the IC card) is read out by the IC card read/write unit 5 in a step S51. Additionally, information about the amount of money is read out by the IC card read/write unit 5 when the fee for the delivery is to be charged simultaneously in the step S51. In case the room number of the addressee is registered in the family ID number information storing area 15 in a step S52, the article receiving/housing unit 1 is opened by unlocking the key 2 in a step S53. However, when the room number as read out is not registered, this means that no destination for the delivery exists in the building currently visited. Consequently, the IC card is returned to the deliveryman (step S62), whereupon the processing now under consideration comes to an end in a step S63. Such situation may occur when the deliveryman has entered or registered erroneously the information about the addressee or when the deliveryman is going to place the article erroneously in the electronic delivery service/reception system 1a installed in association with another or different building.

When the article receiving/housing unit 1 is unlocked with the key 2, the room number of the addressee is displayed on the display unit 6 in a step 54, indicating that the article has been placed into the article receiving/housing unit 1. Additionally, the ID numbers of the individual addressees are read out from the family ID number information storing area 15 by making use of the information about the addressee's room number. Subsequently, the ID number as read out is registered in the addressee ID number storing area 13 in a step S55. Similarly, when the information about the amount of money is read out from the IC card in the step S56, the amount of money is displayed on the display unit 6 in a step S57 and stored at the same time in the amount-of-money information storage unit 10 in a step S58.

In this conjunction, such arrangement may equally be adopted that the information about the amount of money displayed on the display unit 6 disappears once having been displayed, and that it can be displayed again upon insertion of the IC card by the addressee. In that case, however, only such accounting (or billing) information may constantly be displayed so that the addressee can understand that the delivery fee must be paid upon reception of the article before he or she inserts the IC card in the article receiving/housing unit 1. Parenthetically, it is equally conceivable to display constantly the room number as well as the information about the amount of money, and additionally, the information about the dispatcher and identity of the article being delivered can be displayed, as occasion requires. To this end, the deliveryman may input in his or her IC card the information about the dispatcher and the identity of the article for delivery, so that the information mentioned above can be read out to be displayed on the display unit 6 after insertion of the IC card in the electronic delivery service/reception system 1a. Furthermore, the display unit 6 for displaying the information about the door-to-door delivery service may be installed on a family-by family basis so that the residents in the individual rooms can know of storage of the articles destined to them, respectively, while they are in their own rooms.

When the deliveryman places the article in the article receiving/housing unit 1 in step S59, he or she can push the input key 9 for messaging the end of the delivery processing to the arithmetic processing unit 7 (step S60). As a result of this, the article receiving/housing unit 1 is locked by the key 2 under the control of the key control unit 3 in a step S61. Besides, the IC card is fed out from the electronic delivery service/reception system 1a under the control of the IC card control unit 4 in a step S62, whereupon operation required for the deliveryman to place the article of concern within the article receiving/housing unit 1 is terminated in a step S63.

Now, description will turn to operation involved in reception of the article by the addressee from the article receiving/housing unit 1. When the addressee or receiver inserts his or her own IC card into the card insertion slot in a step S21, the IC card is fed into the electronic delivery service/reception system 1a under the control of the IC card control unit 4. In succession, the ID number of the IC card is read out by the IC card read/write unit 5 to be subsequently supplied to the arithmetic processing unit 7 in a step S22. Then, the arithmetic processing unit 7 confirms or checks whether or not .the ID number of the due addressee is stored in the addressee ID number storing area 13 in a step S23. In this conjunction, it should be noted that when an article destined to the addressee is housed within the article receiving/housing unit 1, this means that the ID number of the addressee is registered. Thus, it can be decided in a step S24 whether or not the ID number read out from the IC card coincides with the registered ID number of the addressee. When no coincidence is detected between the registered ID number of the addressee and the ID number read out from the IC card, the IC card is rejected or discharged from the electronic delivery service/reception system 1a, and thus the article can not be taken out from the article receiving/housing unit 1. In this way, reception of the article by an unauthorized person or stealing of the article can positively be prevented.

When the information concerning the amount of money is found as being registered in the amount-of-money information storage unit 10 in a step S25, this means that the delivery fee has to be collected or charged upon reception of the article. Consequently, information about the deposit balance is read out from the IC card in a step S26 for confirming whether or not the amount of money to be charged can be afforded (step S27). If the delivery fee can not be afforded by the remaining amount of money, this fact is displayed on the display unit 6 in a step S40. Thereafter, the IC card is rejected and discharged in a step S41. Thus, in order to receive the article placed in the article receiving/housing unit 1, the addressee has to input at least a complementary amount of money in the IC card and perform the similar operation as mentioned above. By contrast, when the balance stored in the IC card shows that it is enough to pay the fee charged for the delivery, the amount of money paid for the delivery of the article of concern is registered in the IC card, whereupon the monetary transaction comes to an end (step S28).

When the key 2 of the article receiving/housing unit 1 is opened by the key control unit 3 in a step S29, the addressee or receiver can take out the delivered article from the article receiving/housing unit 1 in a step S30. Thereafter, the receiver pushes the input key 9 for thereby messaging the end of the reception processing to the arithmetic processing unit 7 in a step S31. As a result of this, the article receiving/housing unit 1 is locked by the key 2 under the control of the key control unit 3 in a step S32. Subsequently, the information registered in the addressee ID number storing area 13 and the amount-of-money information storage unit 10 are erased in a step S33. Additionally, information displayed on the display unit 6 is also erased in a step S34. Furthermore, the IC card is discharged from the article receiving/housing unit 1 under the control of the IC card control unit 4 in a step S41, whereupon operation or procedure which allows the addressee or receiver to take out the article delivered to him or her from the article receiving/housing unit 1 comes to an end (step S42).

As is apparent from the foregoing, by applying the electronic money system or transaction-oriented electronic accommodation system based on the use of the IC card to the electronic delivery service/reception system 1a, it is possible to perform th e processing for opening/closing of the article receiving/housing unit 1 with the key 2 and at the same time the processing for the monetary transaction when payment upon reception of the article delivered is required. Parenthetically, the information of amount of money inputted to the IC card is transmitted to a center office of the delivery dealer or a bank, to be thereby processed correspondingly.

In the foregoing description of the transaction-oriented electronic accommodation system applied to electronic home-by-home delivery service/reception system illustrated in FIG. 1, it has been assumed that the arithmetic processing unit 7 is incorporated in the electronic delivery service/reception system 1a. However, the arithmetic processing unit 7 may collectively be provided in association with the electronic delivery service/reception systems 1a to 1c or other and a centralized management/control unit 19, as will be described later on by reference to FIG. 6. In that case, by transferring the open/close signal of the article receiving/housing unit 1 by the key 2 through the medium of the line control unit 8, a centralized management/control of the electronic delivery service/reception systems 1a to 1c can be realized. In that case, the electronic delivery service/reception system 1a can be implemented at low cost. In this conjunction, it should be mentioned that there are displayed on the display unit 6 of the centralized management/control unit 19 the information concerning presence/absence of the addressees, the room numbers of the addressees, the amount of money and other information in the electronic delivery service/reception systems 1a to 1c, respectively.

At this juncture, it will be helpful for better understanding of the invention to make complementary description of the ID number storage unit 11. It is presumed that the ID number storage unit 11 is destined to store therein the family ID number information and the authorized dealer ID numbers. Registration of the family ID number information can be realized by inserting the IC cards of the members of a family after having changed over the operation mode of the electronic delivery service/reception system 1a to the registration mode. Such change over is done, for example, by means of the input key 9 to thereby allow the family ID number information to be registered in the family ID number information storing area 15. By virtue of such arrangement, any one of a family can receive a delivered article destined for a member of that family. Further, registration of the authorized dealer ID(s) can be performed in a similar manner.

Furthermore, although it has been described in conjunction with the instant embodiment that the room number of the addressee or receiver is inputted to the IC card of the dealer, it should be appreciated that the ID number itself of the addressee may be inputted to the IC card. Besides, instead of registering the ID number information of all the members constituting a family, it is equally conceivable to register the ID number(s) of the IC card(s) issued to a specific person or persons of the family so that delivered articles can be received only by that specific person or persons. Additionally, for coping with such a case that the balance is short of the amount of money as required, there may also be conceived a method of payment partially in cash or use of a credit card.

Figure 7:
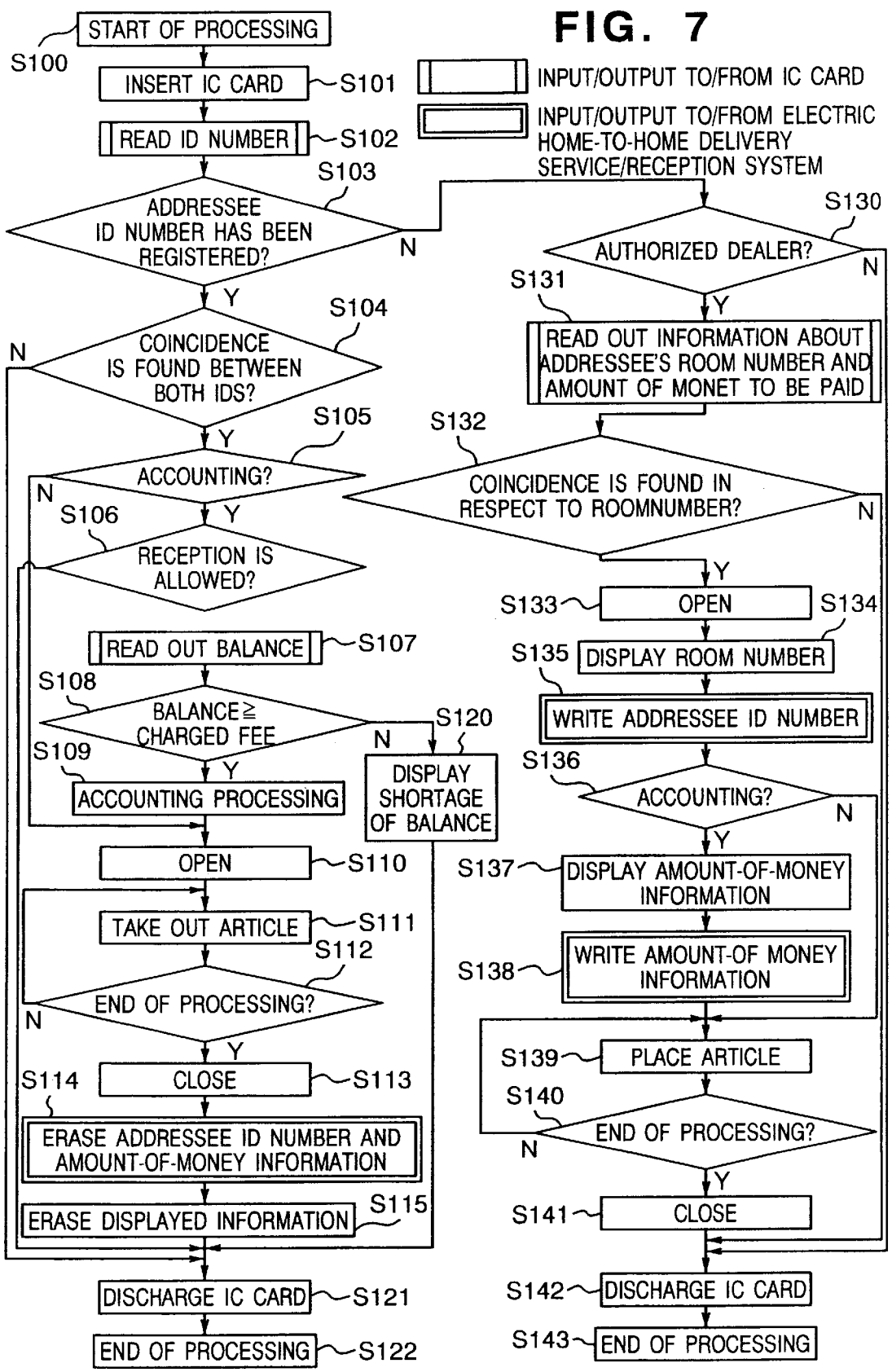
FIG. 7 is a flow chart for illustrating operations of the electronic home-by-home (or door-to-delivery) service/reception system according to the invention.

Next, by referring to a flow chart shown in FIG. 7, another exemplary embodiment or application of the electronic delivery service/reception system 1a will be described. In this case, the processing for allowing the deliveryman to place an article(s) to be delivered in the article receiving/housing unit 1 is similar to the processing illustrated in the flow chart of FIG. 5. In the case of the procedure shown in FIG. 5, the accounting processing (i.e., charged fee payment processing) is forcibly carried out at the time point the addressee receives an article as delivered. As a consequence, in the case where an article which is not wanted by an addressee has been delivered, then a corresponding amount of money will be subtracted from the balance recorded in the IC card, which is of course undesirable for the addressee. To cope with such unwanted situation, the procedure illustrated in the flow chart of FIG. 7 is so programmed that when the ID number of the IC card of the addressee coincides with the content registered in the addressee ID number storing area 13 (step S104), and when the amount-of-money information is written in the amount-of-money information storage unit 10 (step S105) (i.e., when the charged fee payment processing or accounting processing, to say in another way, is to be performed), the addressee can first confirm the amount-of-money information and the content of the delivered article as displayed on the display unit 6 before he or she operates the input key 9 for indicating readiness for receiving the delivered article (step S106). Then, the succeeding processing can be performed. Thus, the addressee can reject reception of any article which he or she does not want.

Figure 8:
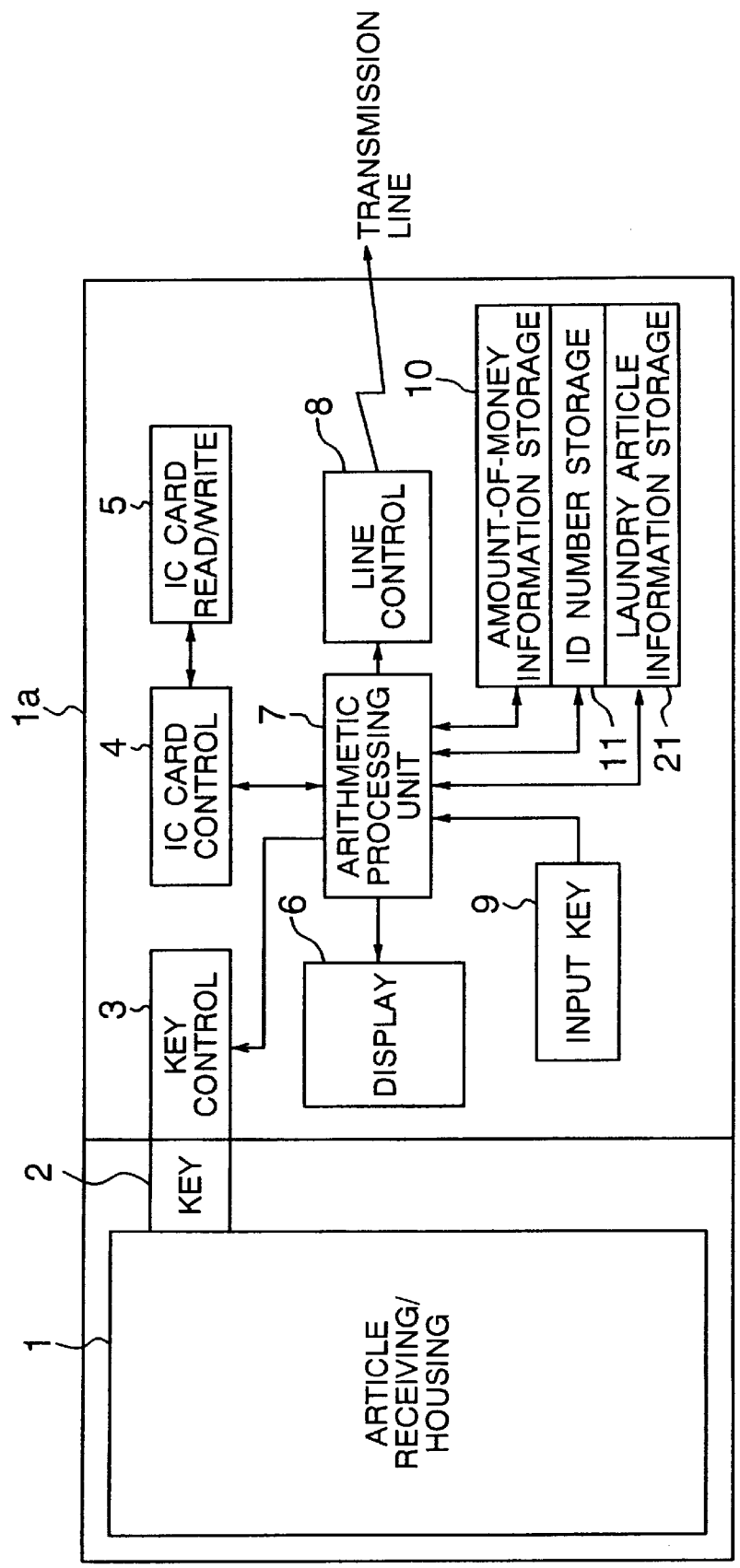
FIG. 8 is a block diagram showing a general arrangement of an electronic laundry service/reception system implemented by applying a transaction-oriented electronic accommodation system according to another embodiment of the present invention.

In the foregoing, description has been directed to the electronic home-by-home delivery service/reception system to which the transaction-oriented electronic accommodation system according to the invention is applied. Now, referring to FIG. 8, description will turn to an electronic laundry service/reception system to which the transaction-oriented electronic accommodation system according to the present invention is applied. In FIG. 8, reference numeral 1 denotes generally an article receiving/housing unit 1, 1a denotes the transaction oriented electronic accommodation system applied to the electronic laundry service/reception system and 21 denotes a laundry article information storage unit for storing information concerning identification numbers of article(s) to be washed and/or having been washed as well as quantity thereof. In the case of the instant embodiment of the invention, it is assumed that an addressee (i.e., person who wants to have articles washed) places articles to be washed in the article receiving/housing unit 1 while a laundryman takes them out for washing the same and after the washing the laundryman puts the article or clothes into the article receiving/housing unit 1 from which the addressee takes them out. This procedure will be described below by referring to flow charts of FIGS. 9 and 10.

At first, description will be directed to a procedure for an addressee or orderer, to say in another word, to put article(s) or clothes to be washed (hereinafter referred to as the laundry for short) into the article receiving/housing unit 1. When the orderer inserts his or her own IC card in the card insertion slot in a step S201, the IC card is fed into the electronic laundry service/reception system 1a under the control of the IC card control unit 4. In succession, the ID number of the IC card is read out by the IC card read/write unit 5 to be subsequently supplied to the arithmetic processing unit 7 in a step S202. Then, the arithmetic processing unit 7 confirms or checks whether or not the ID number of the due addressee or orderer is stored in the addressee ID number storing area 13 in a step S203. In this conjunction, when no article to be washed (i.e., the laundry) is placed within the article receiving/housing unit 1, this means that the ID number of the orderer (addressee) is not registered. Consequently, the processing proceeds to a step S204. At this time point, processing for confirming whether or not the ID number read out from the IC card is registered in the authorized laundry dealer ID number storing area 14. Because the ID number of the addressee is not registered in the authorized dealer ID number storing area 14, the processing following the step 220 is executed.

When the article receiving/housing unit 1 is opened by unlocking it with the key 2 (step S220), there is displayed on the display unit 6 the room number of the orderer (client) together with a message informing the laundry request in a step S221. Subsequently, the ID number of the orderer or client is registered in the addressee ID number storing area 13 in a step S222. After the clothes to be washed have been placed within the article receiving/housing unit 1 (step S223), the client (addressee) can input the information concerning the content of the laundry and the quantity thereof by manipulating the input key 9 (step S224). Then, the information as inputted or registered is displayed on the display unit 6 (step S225) and at the same time written in the laundry article information storage unit 21 (step S226). When the orderer issues by pushing the input key 9 the information indicating the end of the processing to the arithmetic processing unit 7 (step S227), the article receiving/housing unit 1 is locked by the key 2 under the control of the key control unit 3 in a step S228. Furthermore, information concerning the content of the laundry as well as the quantity thereof registered by the client or orderer is written into the IC card. In succession, the IC card is discharged under the control of the IC card control unit 4 in a step S229, whereupon operation for putting the laundry article or clothes in the article receiving/housing unit 1 is terminated (step S230). Parenthetically, the laundry designation and the quantity as registered by the orderer (addressee) may be printed out.

Next, description will be directed to operation involved when the dealer (e.g. a laundryman or washerman) takes out the article(s) to be washed (i.e., the laundry) from the article receiving/housing unit 1. To this end, the dealer or laundryman inserts his or her own IC card in the card insertion slot in a step S201. Then, the IC card is fed into the electronic laundry service/reception system 1a under the control of the IC card control unit 4. In succession, the ID number of the IC card is read out by the IC card read/write unit 5 to be subsequently supplied to the arithmetic processing unit 7 in a step S202. Then, the arithmetic processing unit 7 checks for confirmation whether or not the ID number of the orderer or customer (i.e., person who orders washing and to whom articles washed are to be delivered is stored in the addressee ID number storing area 13 in a step S203. When an article or articles to be washed (i.e., the laundry) is housed within the article receiving/housing unit 1, the ID number of the orderer is registered. Accordingly, the processing proceeds to a step S204. Next, in a step S241, presence or absence of the information concerning the amount of money is checked. Of course, such information is not stored in the amount-of-money information storage unit 10 before washing. Consequently, the processing proceeds to a routine which follows a step S270 shown in FIG. 10.

Figure 10:
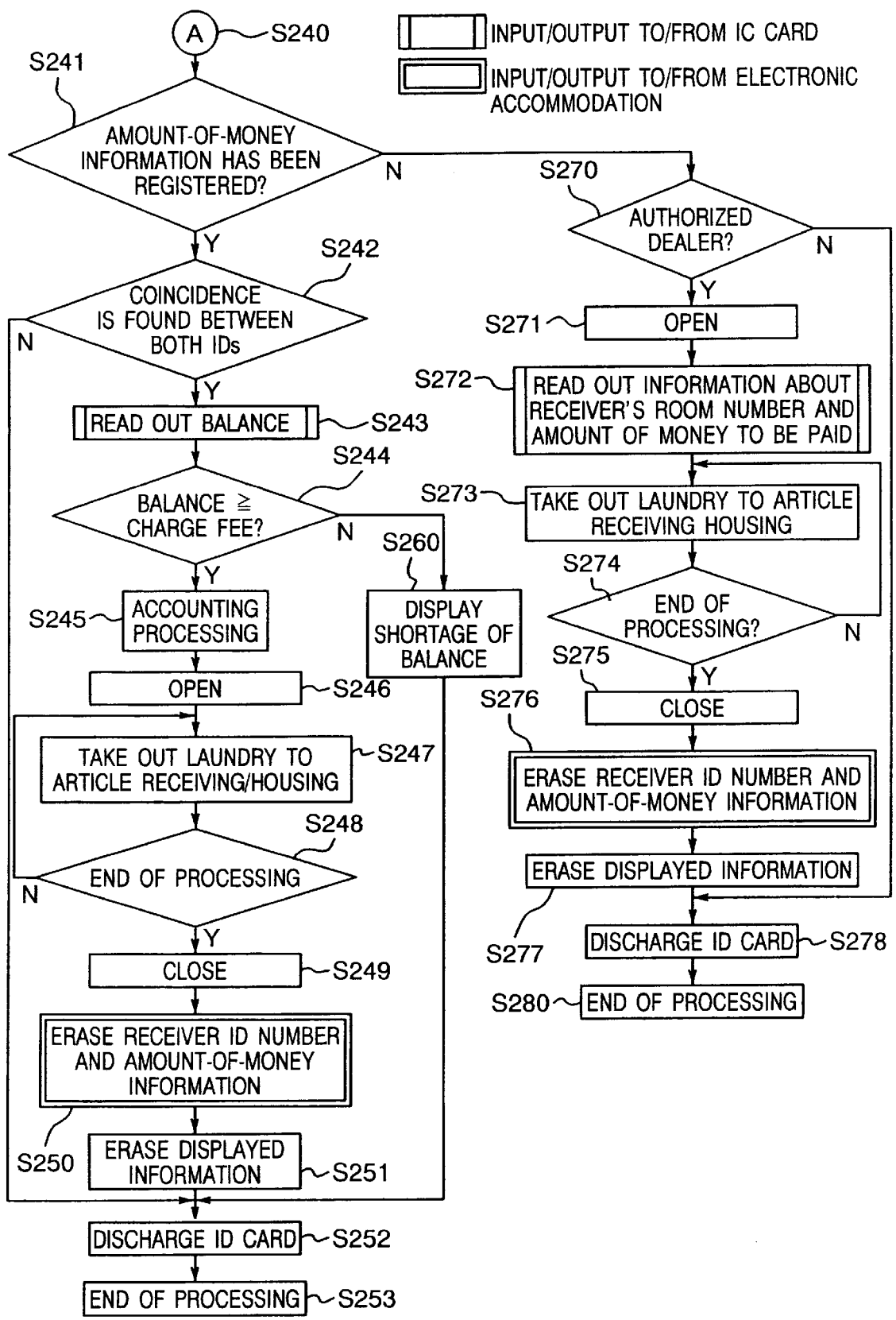
FIG. 10 is a flow chart for illustrating operations of the electronic laundry service/reception system shown in FIG. 8.

Referring to FIG. 10, it is checked for confirmation whether or not the ID number of the laundryman is registered in the authorized dealer ID number storing area 14. In a step S271, the article receiving/housing unit 1 is unlocked with the key 2. In this conjunction, it will be appreciated that because only the authorized dealer can unlock the article receiving/housing unit 1 with the key 2, any unauthorized operation such as steal can positively be prevented. When it is confirmed that the laundryman belongs to the authorized dealer, then information of the room number of the orderer (addressee or receiver) as well as information concerning the articles to be washed and the quantity thereof is written in a memory incorporated in the laundryman's IC card in a step S272. In that case, the information about the room number is derived from the order's ID number on the basis of the information stored in the family ID number information storing area 15.

When the laundryman takes out the article to be washed from the article receiving/housing unit 1 in a step S273, then he or she pushes the input key 9 to inform the arithmetic processing unit 7 of the end of the laundry take-out processing (step S274). In response, the key 2 of the article receiving/housing unit 1 is locked by the key control unit 3 (step S275). Further, information stored in the addressee ID number storing area 13 and the laundry article information storage unit 21 is erased (step S276) with the displayed information on the display unit 6 disappears (step S277). Finally, the IC card is discharged from the electronic laundry service/reception system 1a under the control of the IC card control unit 4 (step S278), whereupon operation for taking out the articles to be washed is completed.

Figure 9:
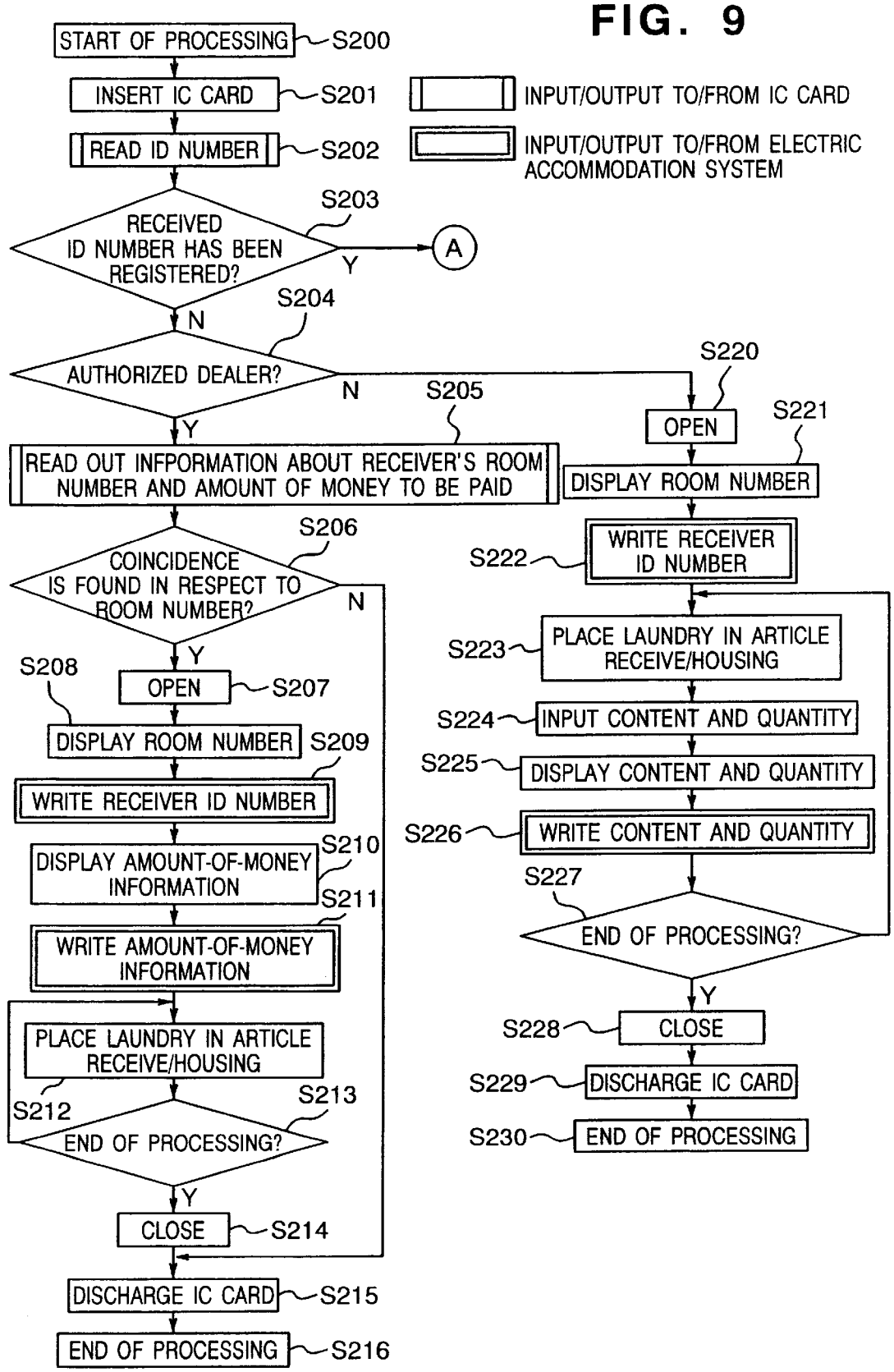
FIG. 9 is a flow chart for illustrating operations of the electronic laundry service/reception system.

Next, description will be directed to operations involved when the laundryman (e.g. the washerman or washerwoman) puts the article(s) washed into the article receiving/housing unit 1. Referring to FIG. 9, when the laundryman inserts his or her own IC card in the card insertion slot in a step S201, the IC card is fed into the electronic delivery service/reception system 1a under the control of the IC card control unit 4. In succession, the dealer's ID number of the IC card is read out by the IC card read/write unit 5 to be subsequently supplied to the arithmetic processing unit 7 in a step S202. Then, the arithmetic processing unit 7 checks for confirmation whether or not the ID number of the due addressee (i.e., the due receiver for the articles washed) is stored in the addressee ID number storing area 13 in a step S203. In this conjunction, it will be appreciated that unless laundry is stored within the article receiving/housing unit 1, this means that the ID number of the addressee can not be registered. Subsequently, the processing proceeds to a step S204. At this time point, it is checked whether or not the ID number read out from the IC card is registered in the authorized dealer ID number storing area 14 (step S204). When the ID number read from the IC card is found to be registered in the authorized dealer ID number storing area 14, the processing proceeds to a step following a step 205 inclusive.

When the laundryman or deliveryman is confirmed as belonging to the authorized dealer, information of the room number of the addressee duly to receive the article washed (which information is stored in the memory of the deliveryman's IC card) and information about the amount of money are read out by the IC card read/write unit 5 in a step S205. In case the room number of the addressee or due receiver of the laundry is found as being registered in the family ID number information storing area 15 in a step S206, the article receiving/housing unit 1 is opened with the key 2 in a step S207. However, when the room number is not registered, this means that no destination for the delivery exists in the building currently visited. Consequently, the IC card is returned to the deliveryman (step S215), whereupon the processing now under consideration comes to an end in a step S216.

When the article receiving/housing unit 1 is unlocked with the key 2, the room number of the due addressee or receiver is displayed on the display unit 6, indicating that the article(s) washed is placed in the article receiving/housing unit 1 (step S208). Additionally, the ID numbers of the individuals belonging to the addressee family are read out from the family ID number information storing area 15 by making use of the information of the room number, to be subsequently registered in the addressee ID number storing area 13 in a step S209. Similarly, information about the amount of money is displayed on the display unit 6 in a step S210 and stored at the same time in the amount-of-money information storage unit 10 in a step S211.

In this conjunction, such arrangement may also be adopted that the information about the amount of money displayed on the display unit 6 disappears after having been displayed once and that the same information can be displayed again upon insertion of the IC card by the addressee. In that case, information about the content and the amount of the articles washed may simultaneously be displayed on the display unit 6. To this end, the deliveryman may input in his or her IC card the information about the content and quantities of the articles washed so that the information mentioned above can be read out to be displayed on the display unit 6 after insertion of the IC card in the electronic laundry service/reception system 1a.

When the dealer puts the article(s) washed into the article receiving/housing unit 1 in step S212, he or she can push the input key 9 for messaging the end of the processing to the arithmetic processing unit 7 (step S213). As a result of this, the key 2 of the article receiving/housing unit 1 is locked by the key control unit 3 in a step S214. Besides, the IC card is fed out from the electronic delivery service/recepfion system 1a under the control of the IC card control unit 4 in a step S215, whereupon operation required for the laundryman or deliveryman to place the article(s) of concern in the article receiving/housing unit 1 is terminated in a step S216.

Finally, description will turn to operation involved in reception of the washed article(s) by the addressee or receiver from the article receiving/housing unit 1. Referring to FIG. 9, when the addressee or receiver inserts his or her own IC card in the card insertion slot in a step S201, the IC card is fed into the electronic laundry service/reception system 1a under the control of the IC card control unit 4. Subsequently, the ID number of the IC card is read out by the IC card read/write unit 5 to be subsequently supplied to the arithmetic processing unit 7 in a step S202. Then, the arithmetic processing unit 7 confirms or checks whether or not the ID number of the due receiver or addressee is stored in the addressee ID number storing area 13 in a step S203. In this conjunction, it should be recalled that when an article washed is housed within the article receiving/housing unit 1, this means that the ID number of the addressee is registered. Accordingly, the processing proceeds to a step S240. In a step S241, presence or absence of the amount-of-money information is checked. Since the amount of money is stored in the amount-of-money information storage unit 10 after the article(s) washed has been placed, the processing proceeds to a routine which follows a step 242 inclusive.

It is decided in the step S242 whether or not the ID number read out from the IC card is registered in the addressee ID number storing area 13. This is for the purpose of preventing other person than the due receiver or authorized dealers from taking out the article(s) from the article receiving/housing unit 1. When it is ascertained that the ID number of the IC card is that of the due receiver, then the information about the balance is read out from the IC card in a step S243 for confirming whether or not the amount of money to be charged can be afforded (step S244). If the fee can not be accommodated by the remaining amount of money, this fact is displayed on the display unit 6 in a step S260. Thereafter, the IC card is rejected and discharged in a step S252. Thus, in order to receive the article placed in the article receiving/housing unit 1, the addressee or receiver has to input a complementary amount of money as information or data in the IC card and thereafter perform the similar operation as mentioned above. By contrast, when the balance stored in the IC card shows that it is enough to pay the fee for the charge, the amount of money of concern is subtracted from the balance or deposit stored in the IC card, whereupon monetary transaction comes to an end (step S245).

When the key 2 of the article receiving/housing unit 1 is unlocked by the key control unit 3 in a step S246, the addressee or receiver can take out the washed article from the article receiving/housing unit 1 in a step S247. Thereafter, the receiver pushes the input key 9 for thereby messaging the end of the processing to the arithmetic processing unit 7 (step S248). As a result of this, the key 2 of the article receiving/ housing unit 1 is locked under the control of the key control unit 3 in a step S249. The amount-of-money information for the article(s) washed is written in the receiver's IC card as information of a receipt. Subsequently, the information registered in the addressee ID number storing area 13 and the amount-of-money information storage unit 10 is erased in a step S250. Additionally, information displayed on the display unit 6 is also erased in a step S251. Furthermore, the IC card is discharged from the article receiving/housing unit 1 under the control of the IC card control unit 4 in a step S252. Thus, operation or procedure which allows the addressee or receiver to take out the article washed from the article receiving/housing unit 1 comes to an end (step S53). At this juncture, it should be mentioned that the amount-of-money information as well as that of quantity of the article(s) washed, etc. may be printed out as a receipt.

As is apparent from the foregoing, by applying the electronic money system or transaction-oriented electronic store system based on the use of the IC card to the electronic delivery service/reception system 1a for a laundry operation, it is possible to perform processing for an opening/closing of the article receiving/housing unit 1 by the key 2 and at the same time processing for the monetary transaction. Accordingly, the laundryman can deliver the article washed to the receiver even when latter is absent.

Incidentally, information of the receiver's or addressee's room number as well as information concerning the quantity of laundry can be read out by the dealer by using an electronic wallet. Besides, such electronic wallet may be used for writing or loading the addressee's room number information and the amount-of-money information in the IC card.

In the foregoing description of the electronic laundry service/reception system illustrated in FIG. 8, it has been assumed that the arithmetic processing unit 7 is incorporated in a plurality of electronic delivery service/reception system. However, the article receiving/housing unit 1 and the centralized management/control unit 19 may be provided separately so that a plurality of article receiving/housing units 1 can be controlled by the latter, as described hereinbefore in conjunction with the electronic home-by-home (or door-to-door) delivery service reception system. Registration of the family ID number information and the authorized or designated dealer ID number may be performed in advance, as in the case of the electronic home-by-home delivery service/reception system.

Although it has been described in conjunction with the instant embodiment that the room number of the addressee or receiver is inputted to the IC card of the dealer, it should be appreciated that the ID number itself of the receiver may be inputted to the IC card. Besides, instead of registering the ID number information of a family, it is equally conceivable to register the ID number(s) of the IC card(s) issued to a person who asks the laundryman to wash so that the delivered articles can be received only by that client. Additionally, for coping with such a case that the balance is short of the amount of money as charged, there may also be conceived a method of payment partially in cash or use of a credit card together with the method mentioned above.

In the IC card of the customer or client for the washing, the contents of the laundry, the quantity thereof and amount-of-money information are inputted so that the IC card serves also as a receipt. In this conjunction, it may be preferred to input the date information in the IC card so that the contents of the records held by the IC card can easily and conveniently be utilized for management. Besides, measures for enabling the contents of the records to be printed out should preferably be adopted.

In the foregoing, the electronic home-by-home (or door-to-door) delivery service/reception system and the electronic laundry service/reception system have been described as exemplary applications of the transaction oriented electronic accommodation system according to the present invention. At this juncture, other examples of the deliveryman's or laundryman's IC card will be described. It is troublesome for the deliveryman to manipulate the key 2 of the article receiving/housing unit 1 and transfer the information concerning the contents of article(s), quantity thereof and the amount-of-money information by inserting the IC card every time the article is delivered. In this conjunction, it should be mentioned that such troublesome procedure can be spared by using a contactless IC card or a portable terminal. In that case, in the contactless IC card carried by the deliveryman in place of the receipts, there may be stored the room number of the addressee, the content of the article to be delivered, information about the quantity thereof, the amount-of-money information etc., wherein the information mentioned above is transmitted to the transaction-oriented electronic accommodation system 1a in a contactless manner to be thereby processed. Similarly, the portable terminal carried by the deliveryman should be so implemented as to be capable of storing the room numbers of all the addressees, the contents of articles to be delivered, quantities thereof, amounts of money, etc., so that when the deliveryman selects a home to which the article of concern should next be delivered, the information relevant to that home or family can be transmitted to transaction-oriented electronic accommodation system 1a in a contactless manner to be thereby processed. Thus, the deliveryman can perform unlocking of the article receiving/housing unit 1 as well as transfer of the information without need for inserting physically the IC card.

Finally, description will be made of another exemplary embodiments or modification of the family ID number information storing area 15 in the transaction oriented electronic accommodation system 1a. In the case of the embodiment described previously, the family ID number information storing area 15 is secured in a dedicated memory incorporated in the electronic delivery service/reception system 1a. As a consequence of this, there arises necessity for the residents in an apartment house to register the family ID number information in the above-mentioned dedicated memory in order to utilize the transaction-oriented electronic accommodation system 1a. In this conjunction, it becomes necessary to make available a memory for storing the family ID number information for each of the families when the key for each room of the apartment house is performed by the ID number of the IC card. For this reason, collation of the family ID number information is realized by making use of the family ID number information stored in the memory prepared for each of the families. In this case, necessity for registering again the family ID number information in the electronic delivery service/reception system 1a.

Figure 11:
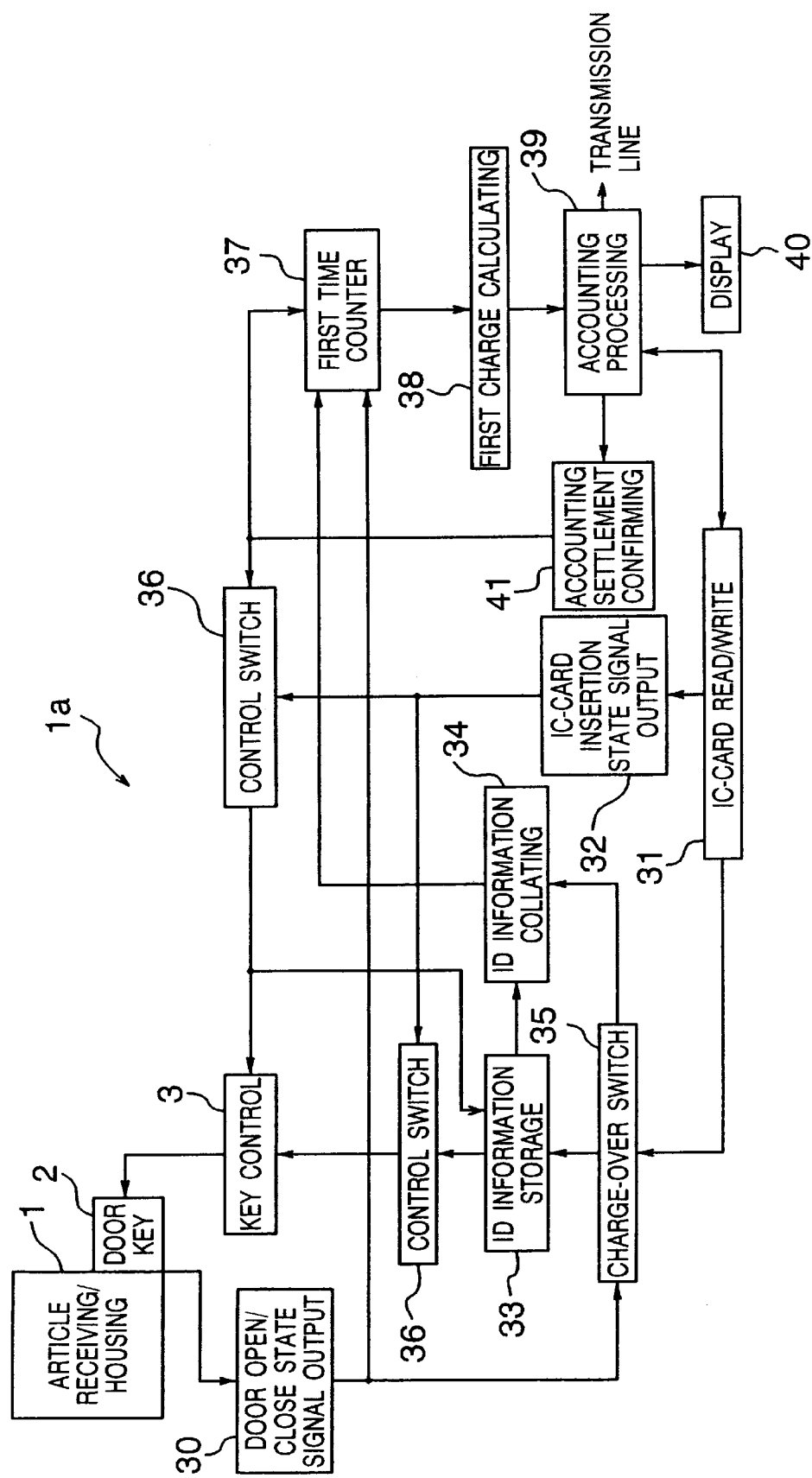
FIG. 11 is a block diagram showing an arrangement of an IC-card-operated electronic locker implemented by applying a transaction-oriented electronic accommodation system according to another embodiment of the present invention.

Next, another application of the transaction oriented electronic accommodation system according to the present invention will be described. FIG. 11 is a block diagram showing an arrangement of an IC card-operated electronic locker system to which the concept underlying the transaction-oriented electronic accommodation system according to the present invention is applied. In FIG. 11, reference numeral 1 denotes an article receiving/housing unit for receiving and housing an article or articles such as luggage by a user, numeral 2 denotes a door key of the article receiving/housing unit 1, 3 denotes a key control unit for controlling lock/unlock of the door key 2, numeral 30 denotes a door open/close state signal output unit for outputting door open/close information by detecting the states of the door of the article receiving/housing unit 1, numeral 31 denotes an IC-card read/write unit for rewriting amount-of-money information stored in an IC card as inserted and for reading/writing a variety of information, numeral 32 denotes an IC-card insertion state signal output unit for outputting state information indicating whether or not and IC card is inserted into the IC-card read/write unit 31, reference numeral 33 denotes an ID information storage unit for storing ID information from the information contained in the IC card and read out by the IC-card read/write unit 31, outputting a control signal for closing the door key 2 while erasing the ID information as stored in response to an output signal indicative of settlement-of-account information which will be described later on, numeral 34 denotes an ID information collating unit for comparing the ID information read out from the inserted IC card with the ID information registered to thereby output a signal upon coincidence between the ID information of the IC card and the registered ID information, numeral 35 denotes a change-over switch unit for supplying the ID information as read out either to the ID information storage unit 33 or the ID information collating unit 34 in dependence on the door open/close information, numeral 36 denotes a control switch unit for controlling output of a signal inputted thereto on the basis of the information signal supplied from the IC-card insertion state signal output unit 32, numeral 37 denotes a first time counter for measuring a time (or temporal period) lapsed from when the door key 2 was closed to a point when the door key 2 is opened, numeral 38 denotes a charge calculating unit for arithmetically determining or calculating a charge (i.e., amount of money) on the basis of the time lapse measured by the first time counter 37, numeral 39 denotes an accounting processing unit for controlling the IC-card read/write unit 31 to rewrite the amount-of-money information stored in the IC card in accordance with the charge calculated by the charge calculating unit 38 while transferring the information concerning the change of the amount-of-money information with a management center, numeral 40 denotes a display unit for displaying a time for which the IC-card-operated electronic locker system has been utilized and the fee to be charged for the utilization and/or the balance held in the IC card after the use of the IC-card-operated electronic locker system, and a reference numeral 41 denotes an accounting settlement confirming unit for outputting a signal indicating settlement of the accounting processing by checking the result of the processing executed by the accounting processing unit 39.

Now, description will turn to operation of the IC-card-operated electronic locker system. At first, let's assume that an article such as luggage is to be housed in an unoccupied compartment (corresponding to the article receiving/housing unit) of the IC-card-operated electronic locker system to which the transaction-oriented electronic accommodation system of the invention is applied. In that case, when a user who wants to use a compartment of the IC-card-operated electronic locker system, he or she opens the door key 2 of the article receiving/housing unit or compartment 1 and places article(s) such as luggage in the compartment and inserts an IC card in the IC-card read/write unit 31. Then, the IC card read/write unit 31 reads the ID information, whereupon a signal indicating the ID information as read out is sent to the changeover switch unit 35. At this time, the door key 2 of the article receiving/housing unit 1 is unlocked (i.e., the door of the compartment is opened). Thus, the door open/close state signal output unit 30 outputs the information indicating the compartment door is opened (hereinafter referred to as the opened-door information). In response to reception of the opened-door information outputted from the door open/close state signal output unit 30, the change-over switch unit 35 accepts the opened-door information supplied from the door open/close state signal output unit 30 to thereby send the ID information from the IC-card read/write unit 31 to the ID information storage unit 33. Thus, the ID information storage unit 33 stores therein the ID information and at the same time supplies a control signal for causing the key control unit 3 to lock the door key 2 to the control switch unit 36. The control signal mentioned above will hereinafter be referred to as the close control signal. In this conjunction, it should be noted that the control switch unit 36 does not output the close control signal to the key control unit 3 in response to the information outputted from the IC card insertion state signal output unit 32 and indicating the state in which the IC card is inserted in the IC card read/write unit 31. By contrast, the control switch unit 36 can output the close control signal to the key control unit 3 in response to the state information outputted from the ID-card insertion state signal output unit 32 in the state where information of the IC card inserted is read out by the IC-card read/write unit 31.

When the user takes out the IC card from the IC-card read/write unit 31, the key control unit 3 accepts the close control signal to thereby lock the door key 2 of the relevant compartment of the article receiving/housing unit 1. At this time point, the door of the article receiving/housing unit 1 is closed. Accordingly, the door open/close state signal output unit 30 outputs information indicating that the door of the relevant compartment of the IC-card-operated electronic locker system is closed. This information will hereinafter be referred to as the closed-door information. The first time counter 37 responds to the closed-door information issued by the door open/close state signal output unit 30 to start measurement of the time lapse, starting from the time point at which the closed-door information is received. Next, description will be directed to the operation or procedure required for taking out an article (luggage) from a compartment of the IC-card-operated electronic locker system. By inserting an IC card into the IC-card read/write unit 31, the IC-card read/write unit 31 reads out the ID information from the IC card inserted, whereon the ID information read out is sent to the change-over switch unit 35. At that time point, because the door of the relevant compartment of the IC card-operated electronic locker system is closed, the door open/close state signal output unit 30 outputs the closed-door information signal. The change-over switch unit 35 responds to reception of the closed-door information for therebY outputting the ID information supplied from the IC-card read/write unit 31 to the ID information collating unit 34. Additionally, the ID information stored nm the ID information storage unit 3S is outputted to the ID information collating unit 34.

The ID information collating unit 34 compares the ID information supplied from the change-over switch unit 35 with the ID information read out from the ID information storage unit 33 to check whether both ID information coincide with each other. When coincidence is detected, the ID information collating unit 34 outputs a time control signal. If otherwise, the time control signal is not outputted. The first time counter 37 responds to reception of the time control signal to stop the measurement of time, whereupon the occupation time during which the article receiving/housing unit 1 has been used (i.e., a time lapsed from closing of the door of the article receiving/housing unit 1 to the opening thereof) is calculated to be subsequently outputted. On the other hand, a first charge calculating unit 38 calculates the amount of money to be charged for the use of the IC-card-operated electronic locker system (hereinafter, the amount of money will also be referred to as the charged fee) on the basis of the time information supplied from the first time counter 37, whereupon the charged fee as calculated is then outputted to the accounting processing unit 39. In turn, the accounting processing unit 39 controls the IC-card read/write unit 31 such that the charged fee is subtracted from the deposit stored in the IC card. Further, the accounting processing unit 39 operates to message the charged fee to the management center and at the same time issue the settlement-of-account information. At this time, information concerning the temporal duration of occupation, the charged fee and the amount of deposit money after subtraction of the charged money is displayed.

When the accounting settlement confirming unit 41 receives the settlement-of-account information from the accounting processing unit 39, the key control unit 3 unlocks the door key 2 of the article receiving/housing unit or compartment 1 and outputs to the control switch unit 36 a control signal for erasing the ID information stored in the ID information storage unit 33. This control signal will hereinafter be referred to as the unlock control signal. At this juncture, it is to be noted that although the control switch unit 36 does not output the door-open control signal to the key control unit 3 in response to the state information signal issued by the ID-card insertion state signal output unit 32 in the state where the IC card is inserted in the IC-card read/write unit 31, the control switch unit 36 can output the door-open control signal to the key control unit 3 and the ID information storage unit 33 when the state information signal outputted from the ID-card insertion state signal output unit 32 indicate that the IC card has been removed from the IC-card read/write unit 31. Then, the key control unit 3 responds to the door-open control signal to thereby unlock the door key 2 of the article receiving/housing unit 1 or compartment while erasing the ID information stored in the ID information storage unit 33.

When the deposit money booked in the IC card can not afford the payment of the charged fee, the accounting processing unit 39 inhibits the ID information storage unit 33 from performing such control for rewriting the information contained in the IC card. This situation is confirmed by the accounting settlement confirming unit 41, whereby unsettled account information is issued. In response to the unsettled account information, the first time counter 37 restarts the measurement of time with the door key 2 of the compartment 1 being left as locked. As will now be understood from the foregoing, in the IC-card-operated electronic locker system according to the instant embodiment of the invention, the locker can be utilized even when the user is not carrying coins. Further, by setting shorter the time interval for updating the charged fee, the IC-card-operated electronic locker system can be made convenient to the user. By way of example, when the user who once closed the door key 2 of the compartment or article receiving/housing unit 1 and now wants to open the door key 2, this can be accomplished by paying a smaller amount of money.

Figure 12:
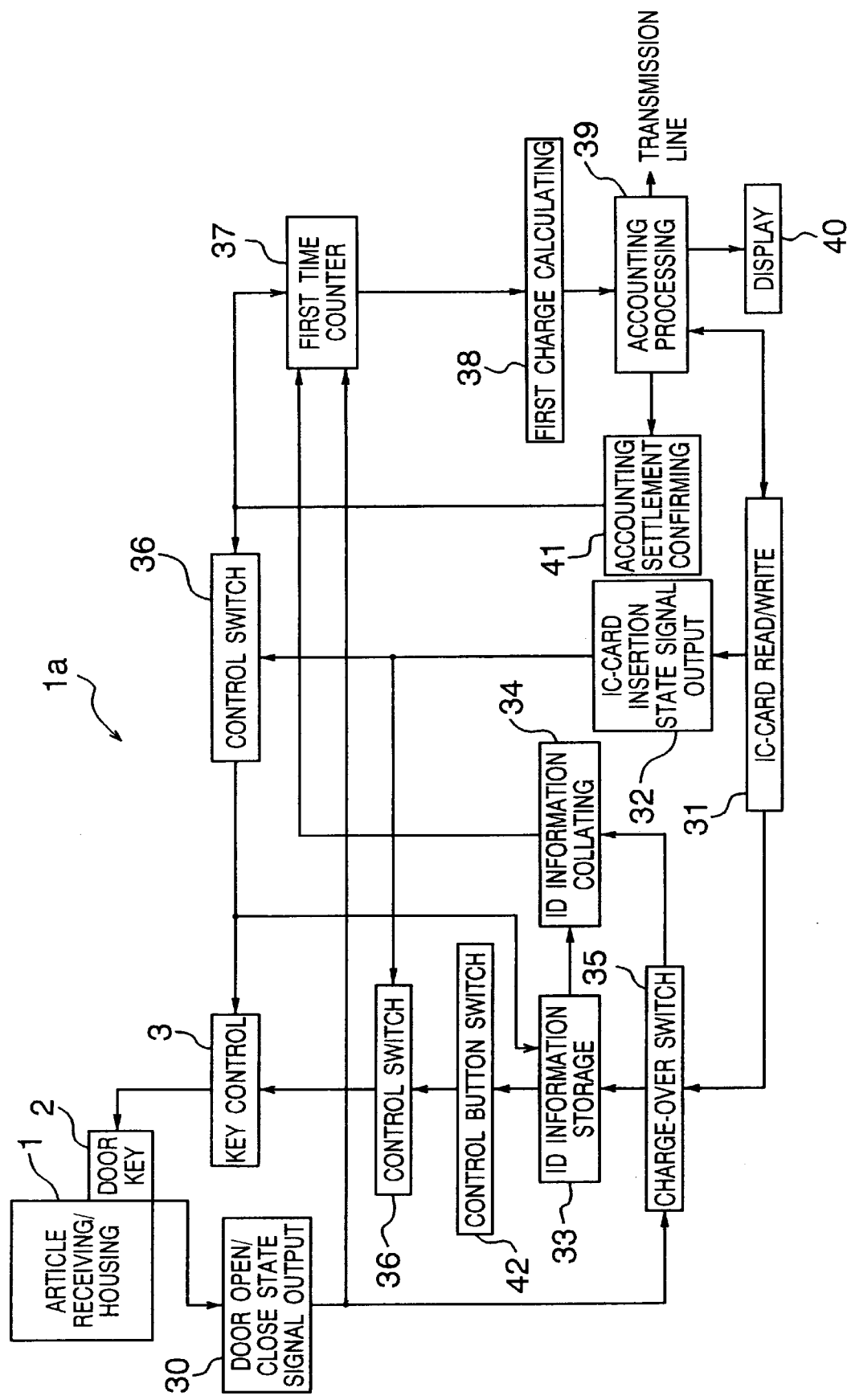
FIG. 12 is a block diagram showing another exemplary embodiment of the IC-card-operated electronic locker system according to the present invention.

FIG. 12 shows another embodiment of the invention according to which the transaction-oriented electronic accommodation system is applied to another IC card-operated electronic locker system. In FIG. 12, those components or units serving for the functions same as or equivalent to those shown in FIG. 11 are designated by like reference characters. In FIG. 12, a numeral 42 denotes a control button switch for controlling the supply of the information from the key control unit 3 to the ID information storage unit 33 by on/off operation.

Now, referring to FIG. 12, description will be made of difference in the operation of the IC-card-operated electronic locker system from that shown in FIG. 11. When a user wants to place luggage in an unoccupied compartment or article receiving/housing unit 1 of the IC-card-operated electronic locker system, he or she inserts the IC card as in the case of the system shown in FIG. 11. Then, the ID information storage unit 33 stores the ID information read out from the IC card and at the same time outputs a door-close control signal to the control button switch 42. In that case, when the control button switch 42 is turned off, the door-close control signal can not be supplied to the key control unit 3. Accordingly, the key control unit 3 does not lock the door key 2 of the compartment or article receiving/housing unit 1 but allows the door to be left in the opened state, while the door open/close state signal output unit 30 continues to output the opened-door information.

Thus, the destination or sink of the signal outputted from the change-over switch unit 35 remains to be the ID information storage unit 33, which means that when another IC card is inserted for allowing the ID information of another IC card to be registered, the information can be stored in the ID information storage unit 33 as well. When the control button switch 42 is turned on after storage of the required ID information of the IC card, then the door-close control signal can be inputted to the key control unit 3 from the ID information storage unit 33. Processing following the operation mentioned above is similar to that described hereinbefore by reference to FIG. 11. It should however be mentioned that in the case of the IC-card-operated electronic locker system according to the instant embodiment of the invention, the door key 2 of the compartment or article receiving/housing unit 1 can be opened with the IC card which stores only the ID information. To say such in another way, a single compartment or article receiving/housing unit 1 can be used by a plurality of users.

Figure 13:
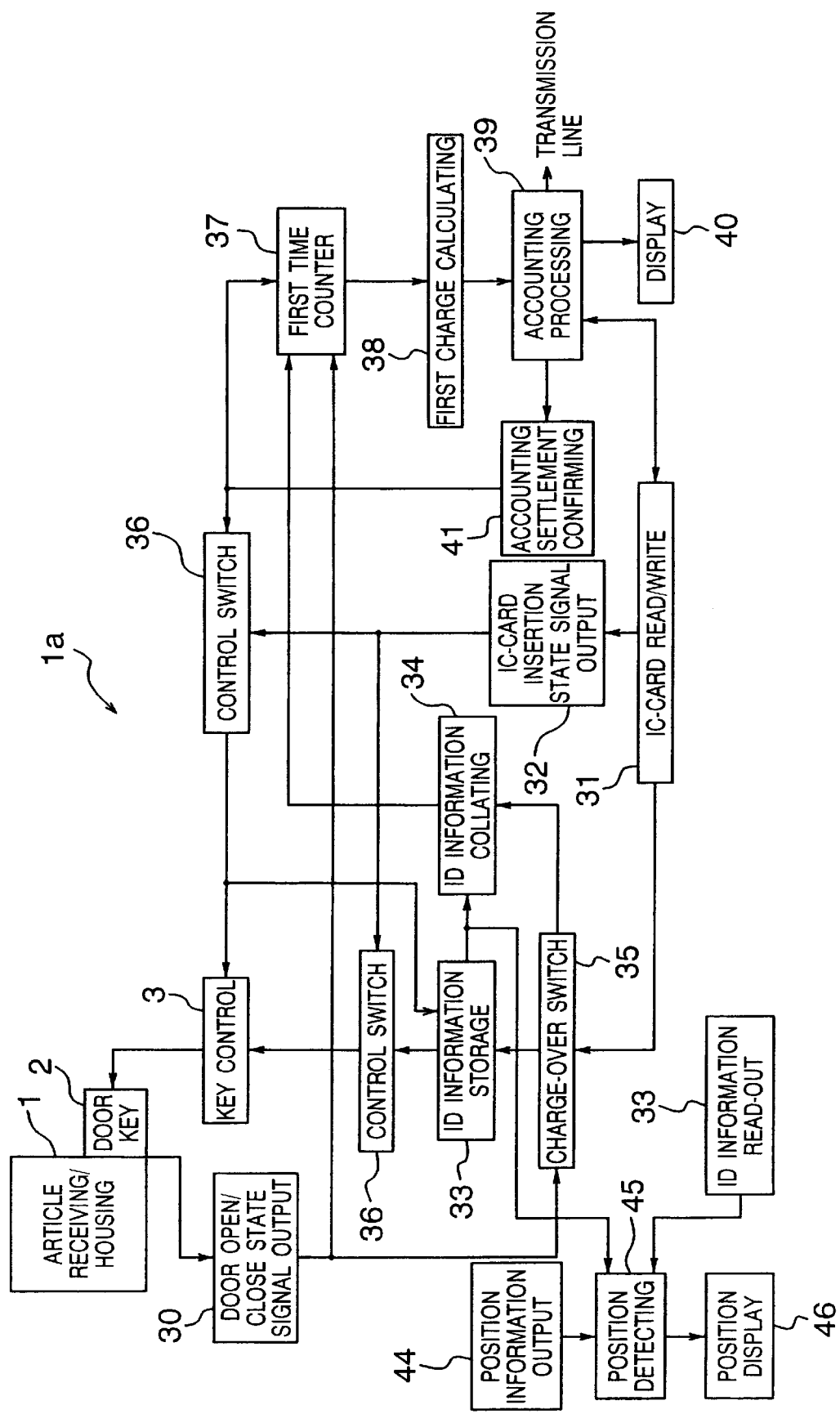
FIG. 13 is a block diagram showing yet another exemplary embodiment of the IC-card-operated electronic locker system according to the invention.

FIG. 13 is a block diagram showing another exemplary embodiment of the IC-card-operated electronic locker system to which the transaction-oriented electronic accommodation system according to the invention is applied. In FIG. 13, those components serving functions which are the same as or equivalent to those illustrated in FIG. 11, are designated by like reference characters. The IC-card-operated electronic locker system shown in FIG. 13 further includes an ID information read-out unit 43 for reading out ID information of an IC card, a position information output unit 44 for outputting information indicating the location of the article receiving/housing unit 1, a position detecting unit 45 for detecting the position of the article receiving/housing unit 1 which corresponds to the ID information read out by the ID information read-out unit 43 on the basis of the ID information stored in the ID information storage unit 33, the position information outputted from the position information output unit 44 and the ID information read out by the ID information read-out unit 43, and a position display unit 46 for displaying the position of the article receiving/housing unit 1 as detected, wherein the ID information read-out unit 43, the position detecting unit 45 and the position display unit 46 are installed at a location in which the IC-card operated electronic locker system is installed, e.g. at an entrance of a locker room.

Now, description will turn to operation of the IC-card-operated electronic locker system by reference to FIG. 13, while putting emphasis on differences from the system shown in FIG. 11. When the user comes to a place where the IC-card-operated electronic locker system is installed such as an entrance of a locker room for taking out luggage or the like, he or she inserts his or her IC card in the ID information read-out unit 43 installed at the entrance. The ID information read-out unit 43 reads out the ID information from the IC card, which information is sent to the position detecting unit 45. In response, the position detecting unit 45 collates the ID information stored in the ID information storage unit 33 with the position information about the article receiving/housing units 1 or locker compartments supplied from the position information output unit 44 to thereby search the ID information which coincides with the ID information sent from the ID information read-out unit 43. In this manner, the position of the article receiving/housing unit 1 or compartment utilized by the user of concern can be detected. In this system, operations and processing such as unlock/lock of the door key 2, settling of account and so forth are similar to those of the IC-card-operated electronic locker system described previously by reference to FIG. 11. With the arrangement of the IC card-operated electronic locker system described above, the user can know rather instantaneously the position of the article receiving/housing unit 1 or compartment in which he or she has stored article(s) such as luggage(s).

Figure 14:
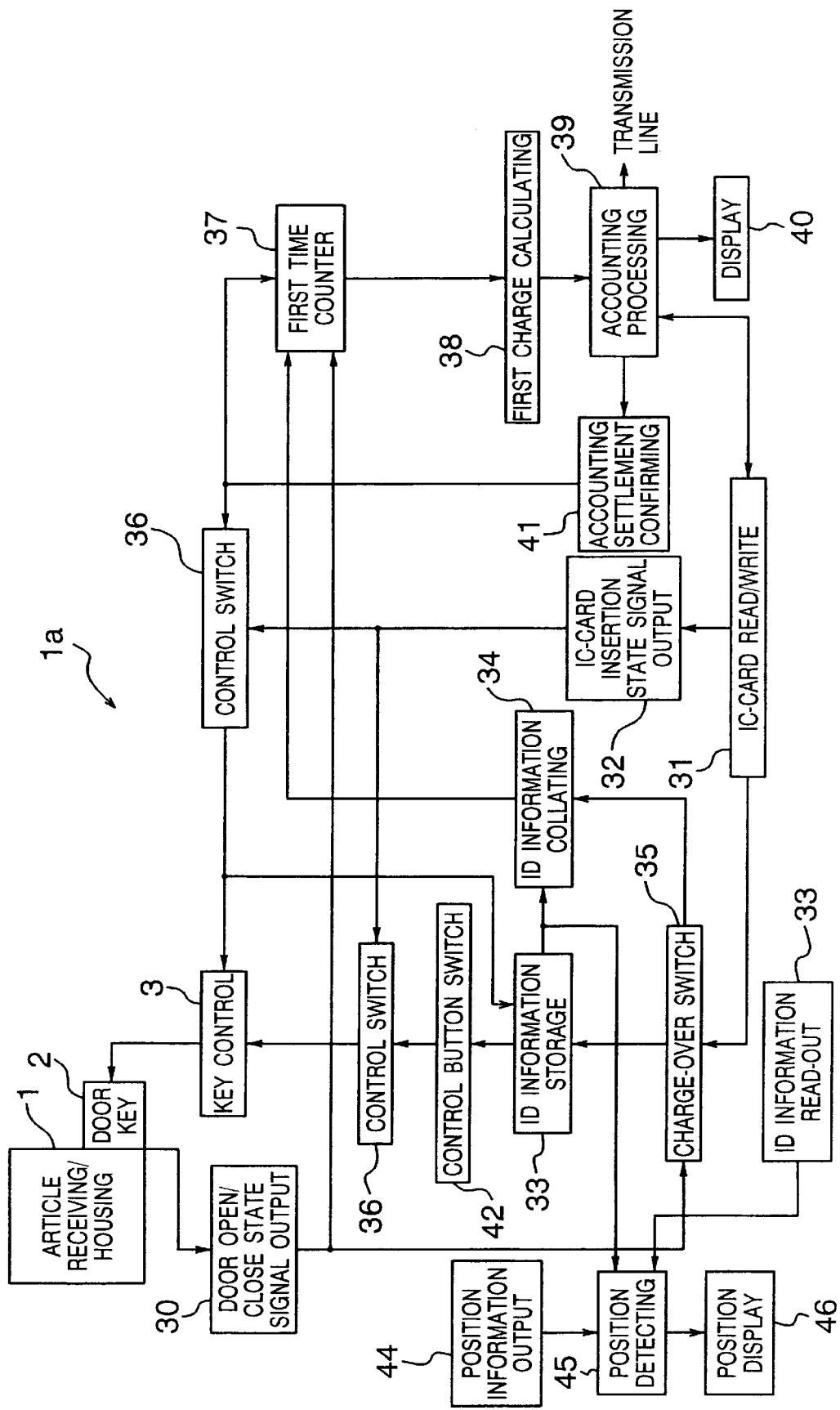
FIG. 14 is a block diagram showing still another exemplary embodiment of the IC-card-operated electronic locker system.

FIG. 14 is a block diagram showing another embodiment of the IC-card-operated electronic locker system to which the transaction-oriented electronic accommodation system according to the invention is applied. In FIG. 14, parts serving for the functions same as or equivalent to those systems shown in FIGS. 11, 12 and 13 are designated by like reference numerals.

The IC-card-operated electronic locker system according to the instant embodiment of the invention corresponds to the IC-card-operated electronic locker system shown in FIG. 12. Such system is so arranged as to store a plurality of ID information in the ID information storage unit 33, wherein the system is added with the function for displaying the position of the article receiving/housing unit 1 or compartment of concern, as described hereinbefore by reference to FIG. 13.

Figure 15:
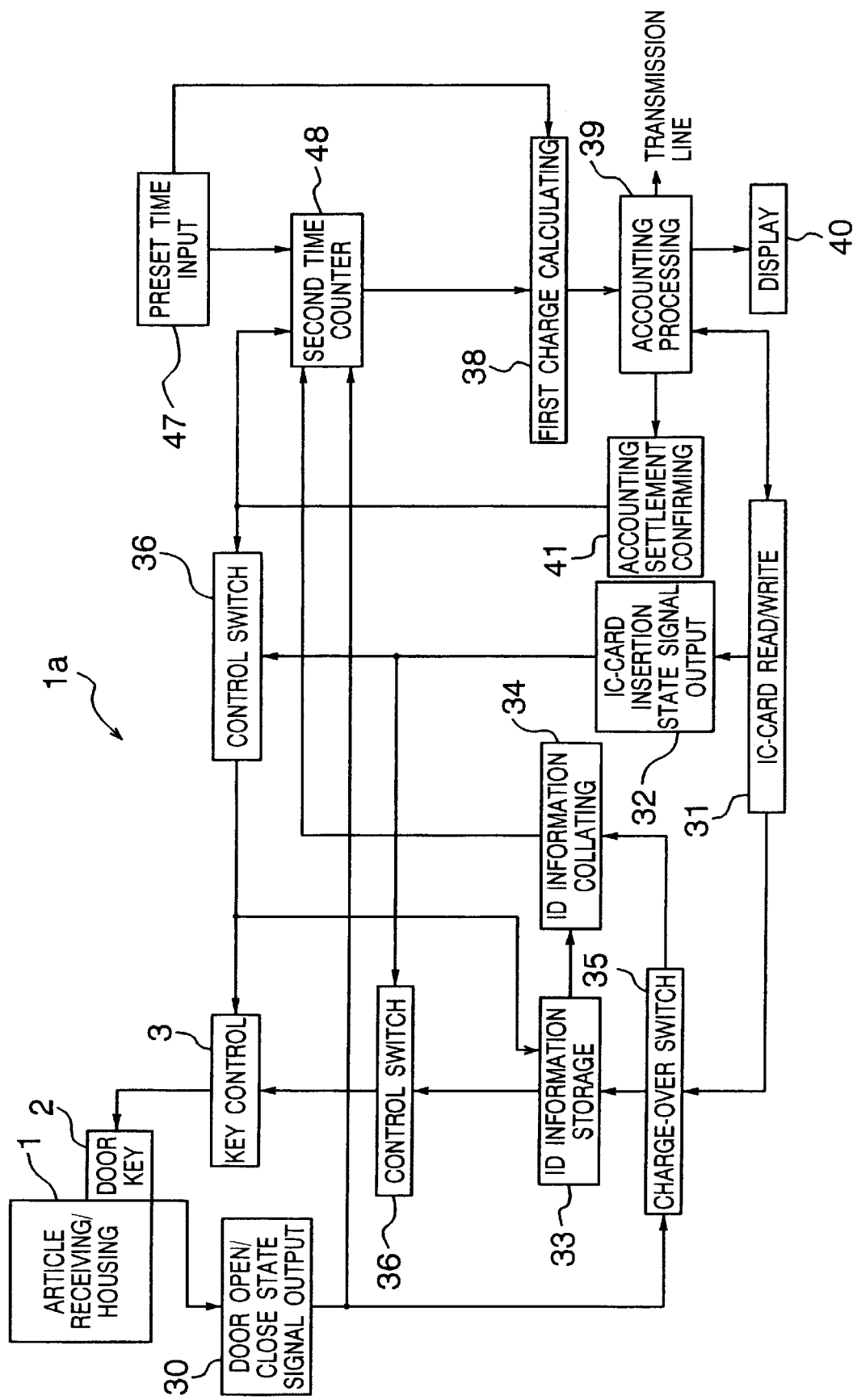
FIG. 15 is a block diagram showing a further exemplary embodiment of the transaction-oriented electronic accommodation system according to the invention applied to an IC-card-operated electronic locker system.

FIG. 15 is a block diagram showing yet another embodiment of the IC-card-operated electronic locker system to which the transaction-oriented electronic accommodation system according to the invention is applied. In FIG. 15, parts serving functions which are the same as or equivalent to those systems shown in FIG. 11, are designated by like reference numerals. The IC-card operated electronic locker system now under consideration further includes a preset time input unit 47 for previously setting a time period providing a basis for charging the fee, and a second time counter 48 for determining by measurement a difference between the aforementioned preset time and a time lapsed from the closing of the door key 2 to the opening thereof, which is indicated by the door open/close information.

Referring to FIG. 15, description will be made of any difference in the operation of the IC-card-operated electronic locker system from that of the IC-card-operated electronic locker system shown in FIG. 11. In the first place, a time equivalent to an amount of money to be charged (hereinafter referred to as the in-advance fee) is set previously. The preset time input unit 47 outputs the preset time to the second time counter 48 and the first charge calculating unit 38. When an article such as luggage is to be placed in the article receiving/housing unit 1 or compartment of the IC-card-operated electronic locker system, an IC card must be inserted in the IC-card read/write unit 31, as described hereinbefore by reference to FIG. 11. Then, the accounting processing unit 39 controls the IC-card read/write unit 31, such that the in-advance fee calculated by the first charge calculating unit 38 on the basis of the preset time information available from the preset time input unit 47 is subtracted from the deposit recorded in the IC card. At the same time, the in-advance fee information is sent to the management center.

Next, description will be directed to the procedure for taking out the luggage or the like from a article receiving/housing unit 1 or compartment of the IC-card-operated electronic locker system. As described hereinbefore by reference to FIG. 11, the second time counter 48 stops the measurement of time in response to the time control signal outputted from the ID information storage unit 33, whereupon a time-difference between the preset time and the time period during which the article receiving/housing unit 1 or compartment has been occupied is determined. When the time period is longer than the preset time, the operations or processings to be executed in succession is similar to those described previously by reference to FIG. 11. However, when the occupation time is shorter than the preset time, such arrangement may be adopted that the accounting processing unit 39 outputs the settlement-of-account information or alternatively the IC-card read/write unit 31 rewrites the deposit information so that the deposit is increased by an amount of money equivalent to the difference between the preset time and the occupation time. In the latter case, the amount equivalent to the difference is messaged to the management center.

Figure 16:
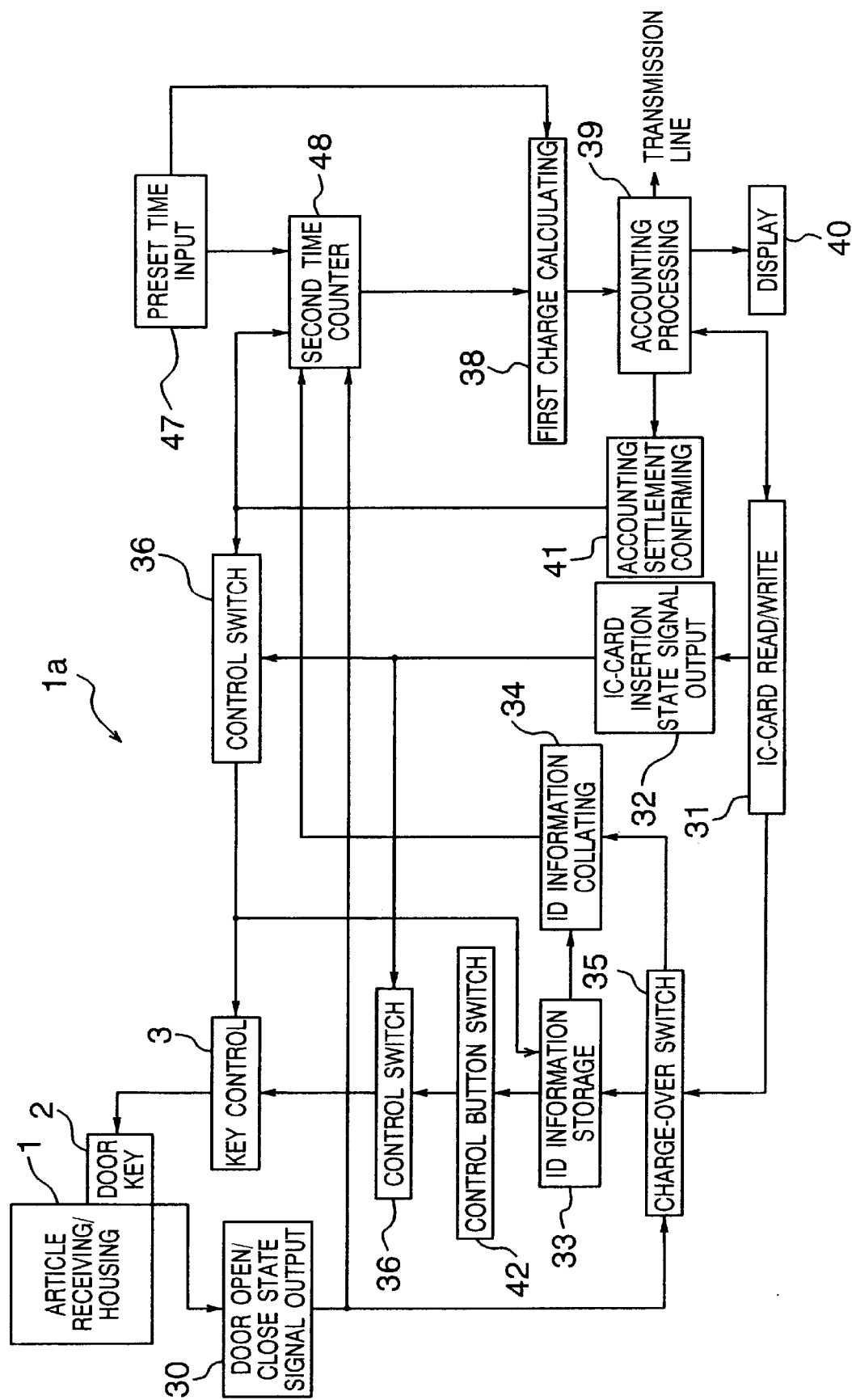
FIG. 16 is a block diagram showing yet further exemplary embodiment of the transaction-oriented electronic accommodation system according to the invention applied to an IC-card-operated electronic locker system.

FIG. 16 shows a yet further embodiment of the invention according to which the transaction-oriented electronic accommodation system is applied to the IC card-operated electronic locker system. In FIG. 16, those components or units serving for the functions same as or equivalent to those shown in FIGS. 11 and 15 are designated by like reference characters.

The IC-card-operated electronic locker system according to the instant embodiment of the invention corresponds to the IC-card-operated electronic locker system described above by reference to FIG. 15, and is equipped with the function for charging a fee equivalent to a preset time. Such system is additionally provided with a function for storing a plurality of ID information in the ID information storage unit 33 with the aid of the control button switch 42 described hereinbefore by reference to FIG. 12.

Figure 17:
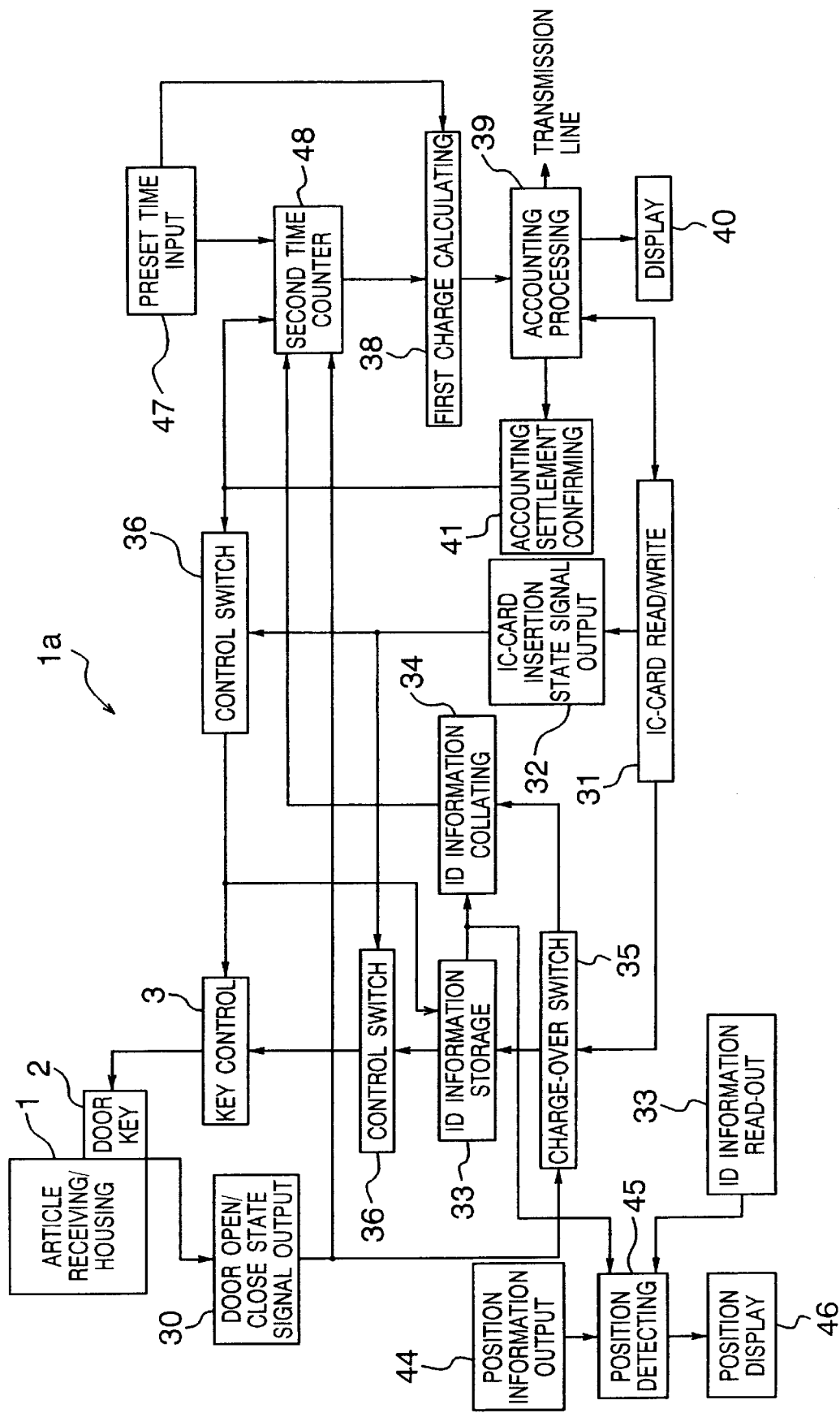
FIG. 17 is a block diagram showing still further exemplary embodiment of the transaction-oriented electronic accommodation system according to the invention applied to an IC-card-operated electronic locker system.

FIG. 17 shows a still further embodiment of the invention according to which the transaction-oriented electronic accommodation system is applied to an IC-card operated electronic locker system. In FIG. 17, those components or units serving functions which are the same as or equivalent to those shown in FIGS. 11, 13 and 15, are designated by like reference characters.

The IC-card-operated electronic locker system according to the instant embodiment of the invention corresponds to the system described above by reference to FIG. 15, and is equipped with the function for charging a fee equivalent to a preset time. Such system is additionally imparted with a function for displaying the position information about the article receiving/housing unit or compartment described hereinbefore by reference to FIG. 13.

Figure 18:
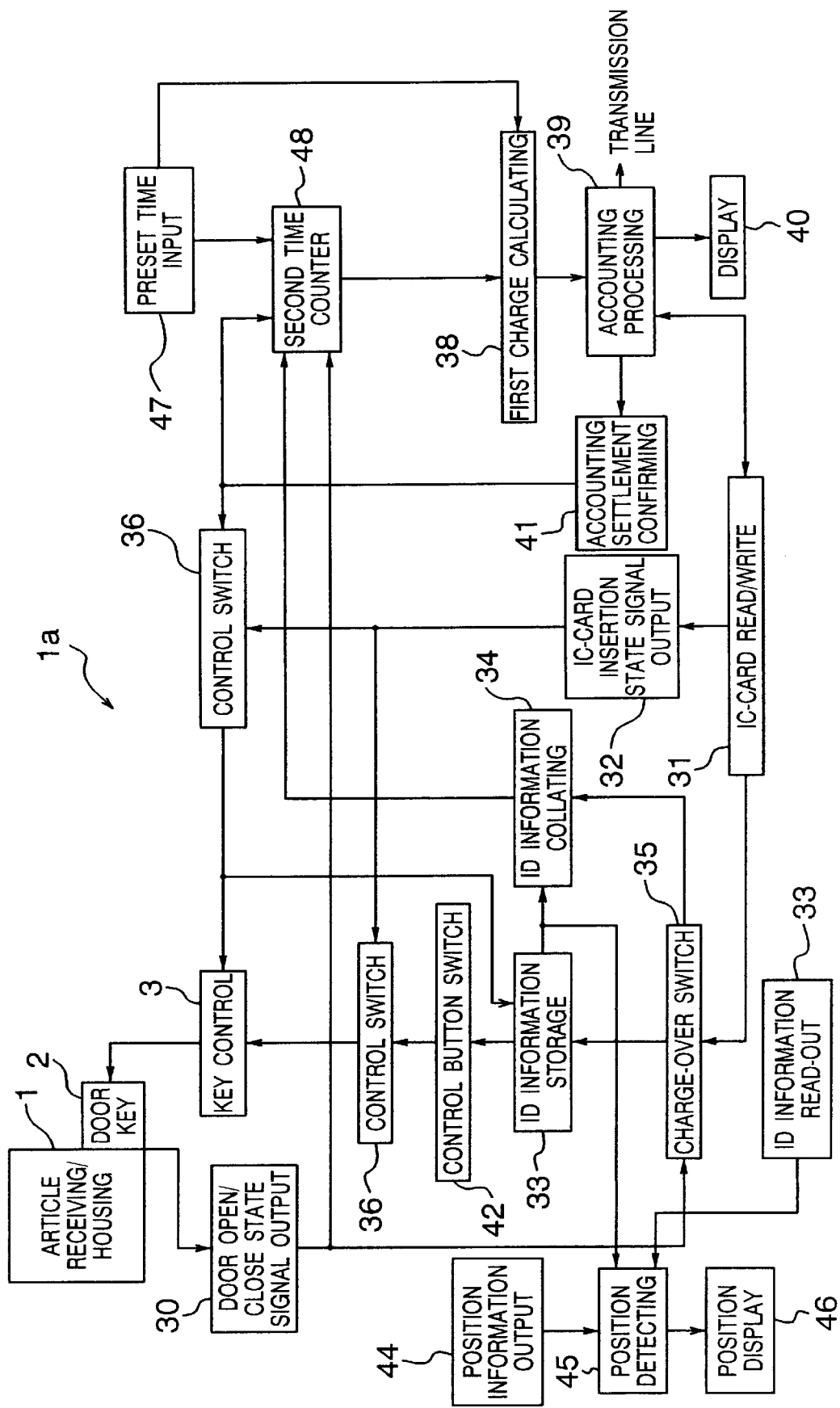
FIG. 18 is a block diagram showing a further exemplary embodiment of the transaction-oriented electronic accommodation system according to the invention applied to an IC-card-operated electronic locker system.

Further, FIG. 18 shows another embodiment of the invention according to which the transaction-oriented electronic accommodation system is applied to the IC card-operated electronic locker system. In FIG. 18, those components or units serving functions which are the same as or equivalent to those shown in FIGS. 11, 12, 13 and 15 are designated by like reference characters.

The IC-card-operated electronic locker system according to the instant embodiment of the invention corresponds to the locker system described above by reference to FIG. 15, and is equipped with the function for charging a fee equivalent to a preset time. Such system is additionally provided with the function for storing a plurality of ID information in the ID information storage unit 33 with the aid of the control button switch 42 described hereinbefore by reference to FIG. 12, and the function for displaying the position information about the article receiving/housing unit or compartment described hereinbefore by reference to FIG. 13.

In the foregoing, the electronic home-by-home (or door-to-door) delivery service/reception systems, the electronic laundry service/reception systems and the IC card-operated electronic locker system to which the transaction-oriented electronic accommodation system according to the invention can be applied, have been described.

Figure 19:
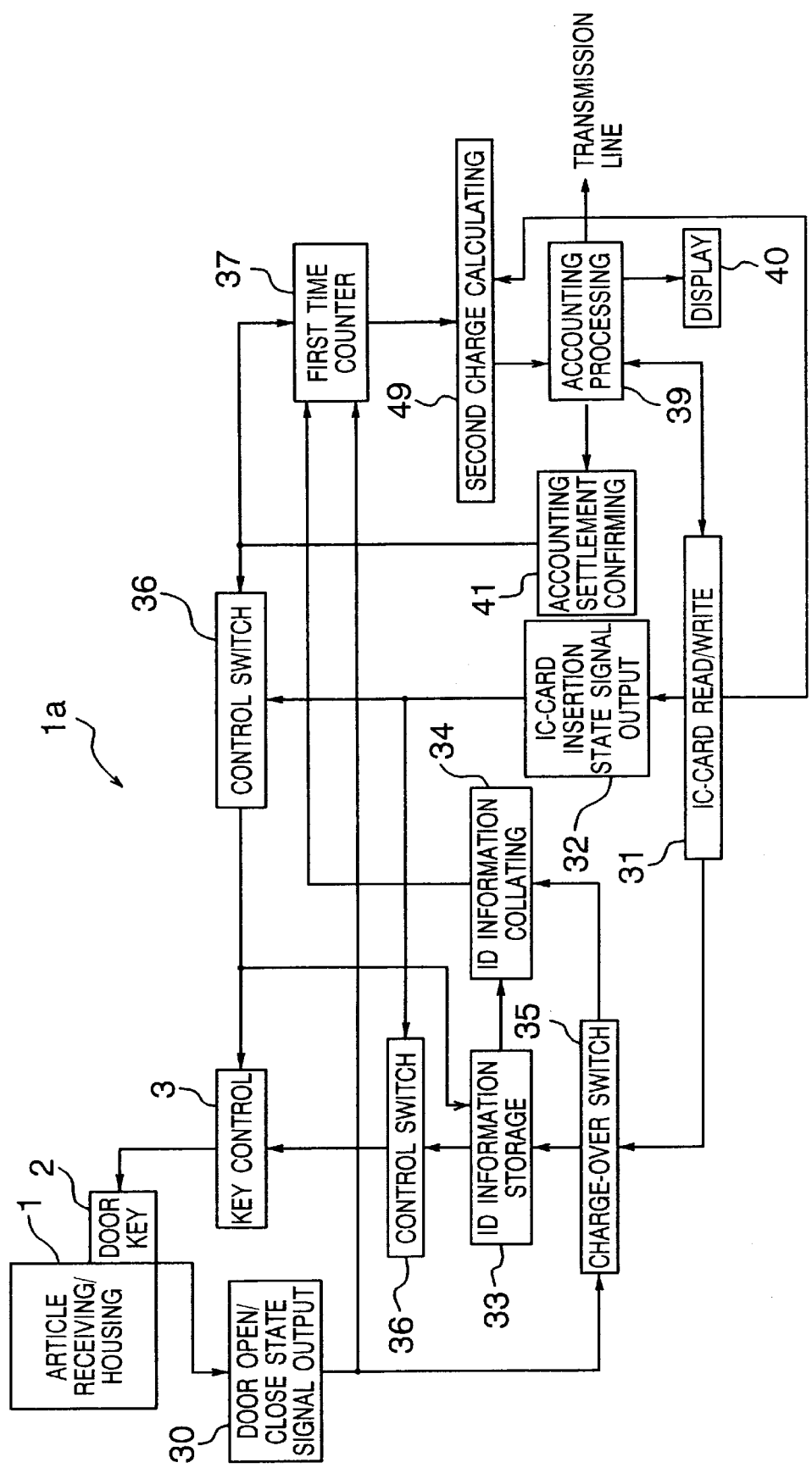
FIG. 19 is a block diagram showing an arrangement of an electronic parking meter system to which the concept underlying a transaction-oriented electronic accommodation system according to the present invention is applied.
Figure 20:
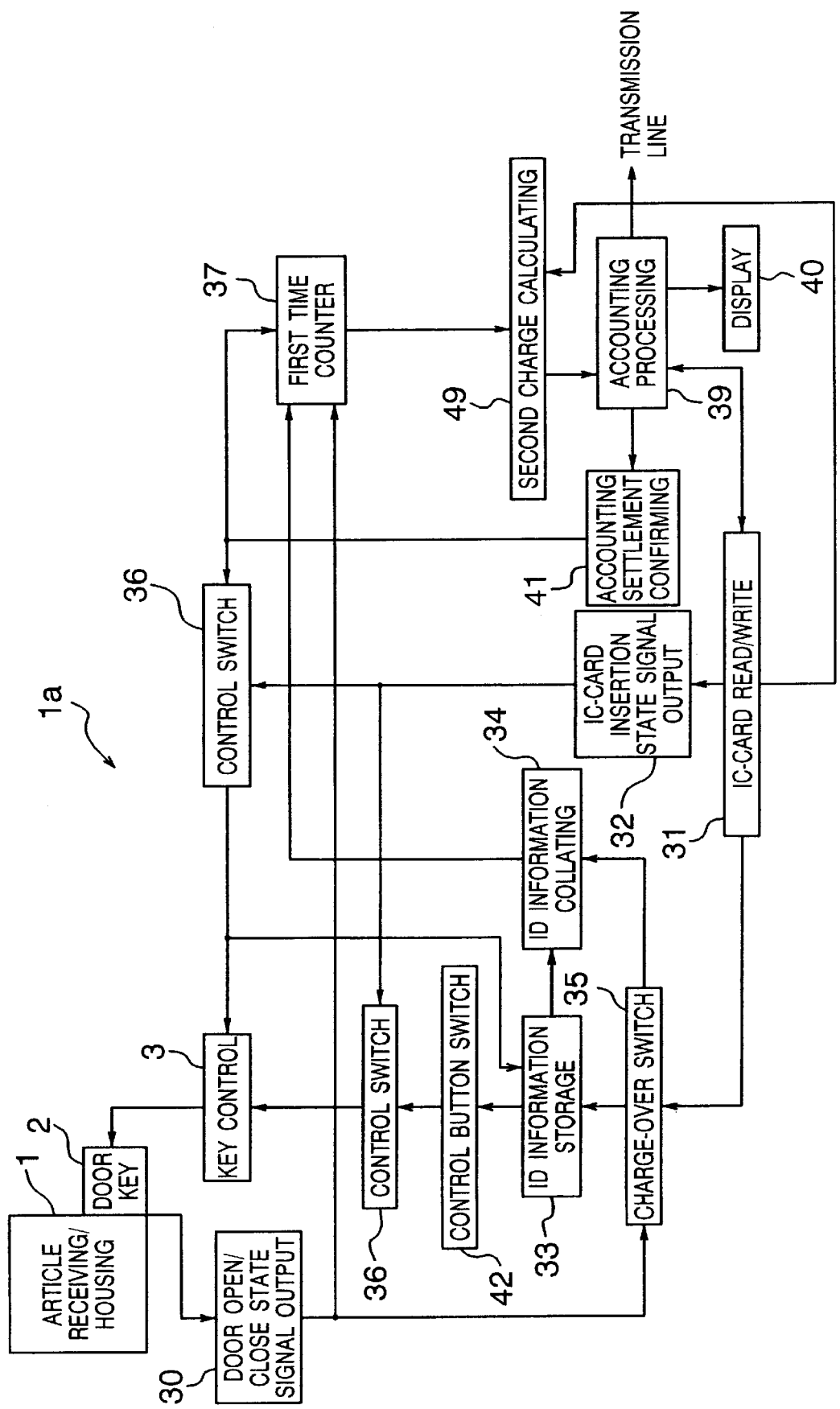
FIG. 20 is a block diagram showing another exemplary embodiment of the transaction-oriented electronic accommodation system according to the invention applied to an electronic parking meter system.
Figure 21:
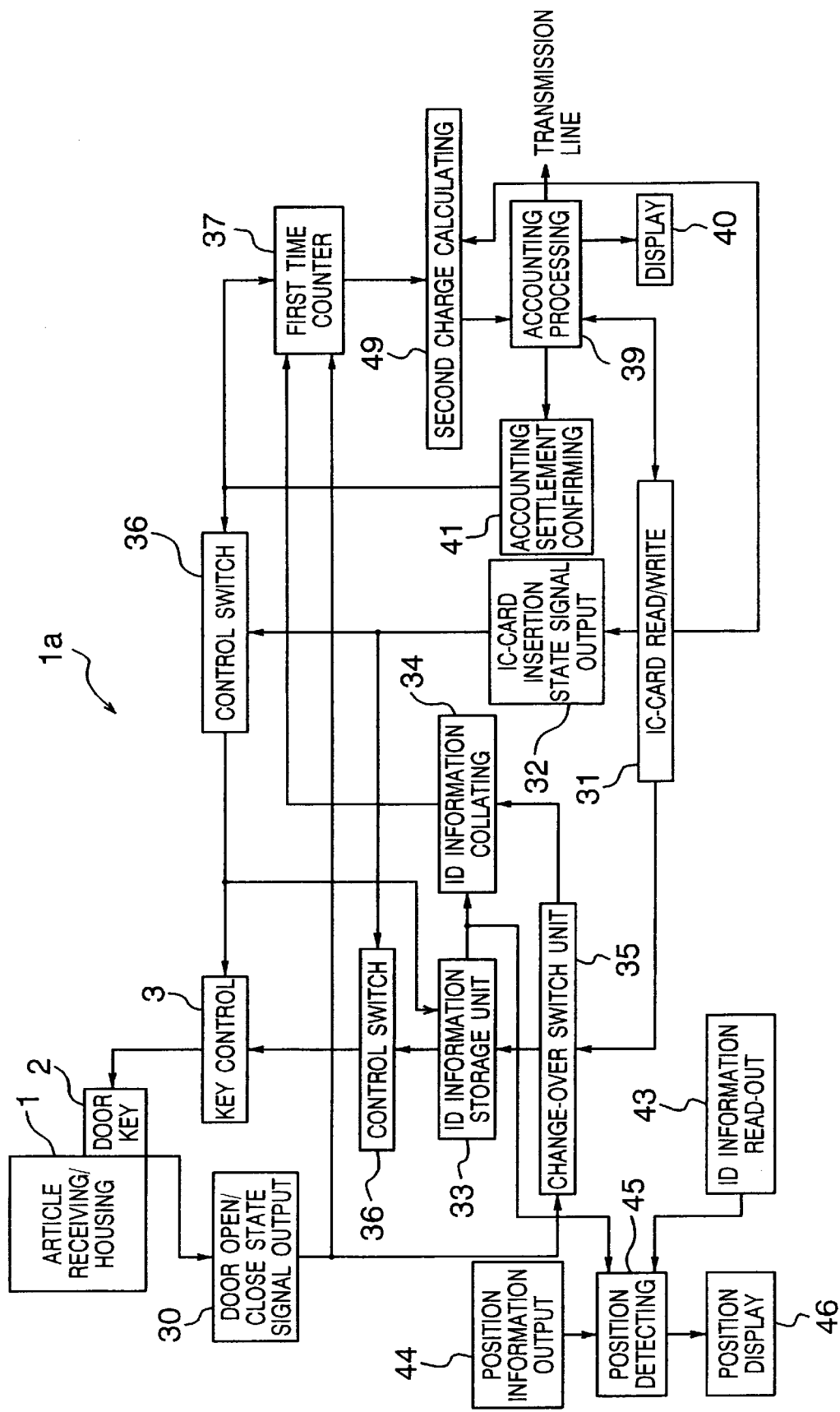
FIG. 21 is a block diagram showing yet another exemplary embodiment of the transaction-oriented electronic accommodation system according to the invention applied to an electronic parking meter system.
Figure 22:
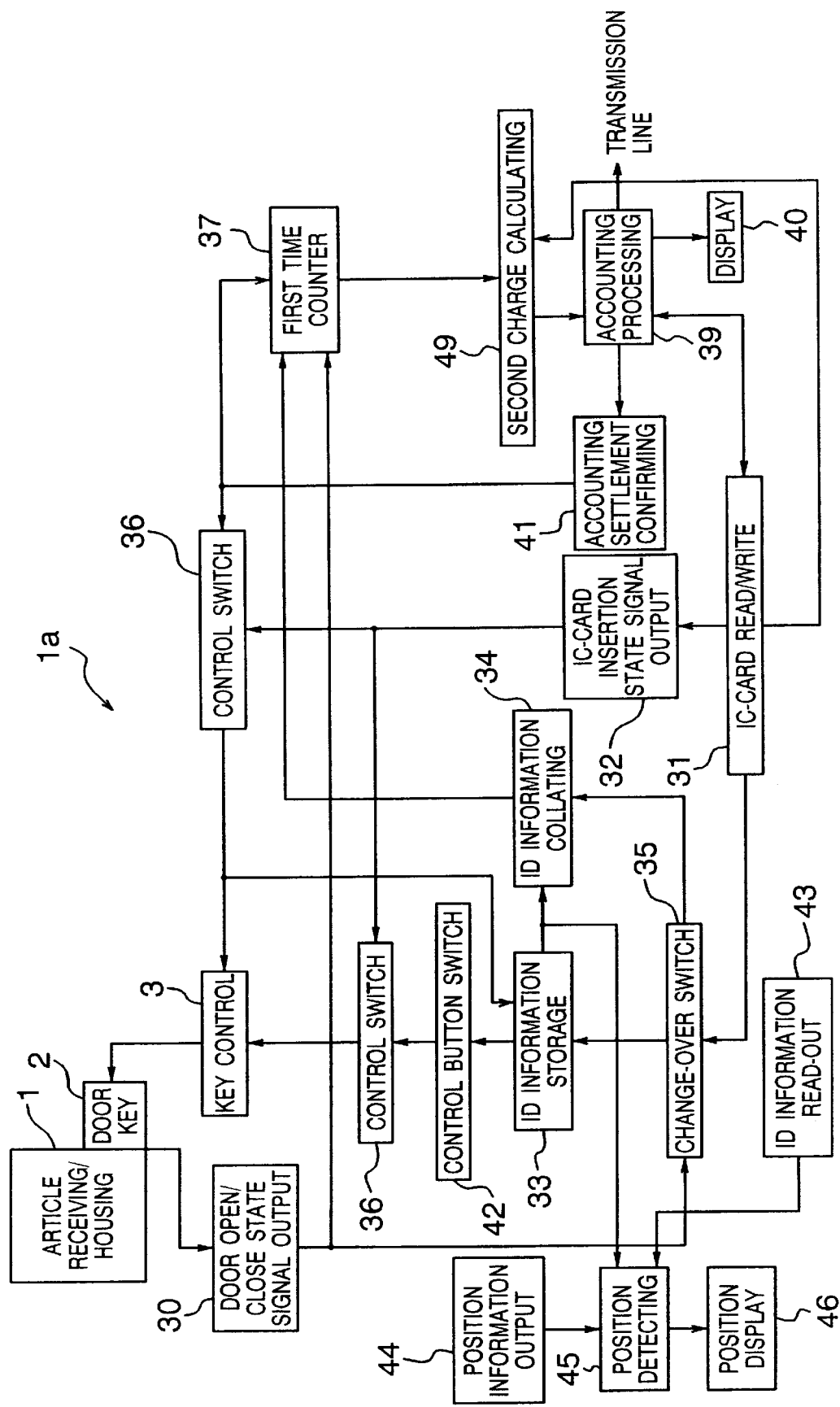
FIG. 22 is a block diagram showing still another exemplary embodiment of the transaction-oriented electronic accommodation system according to the invention applied to an electronic parking meter system.
Figure 23:
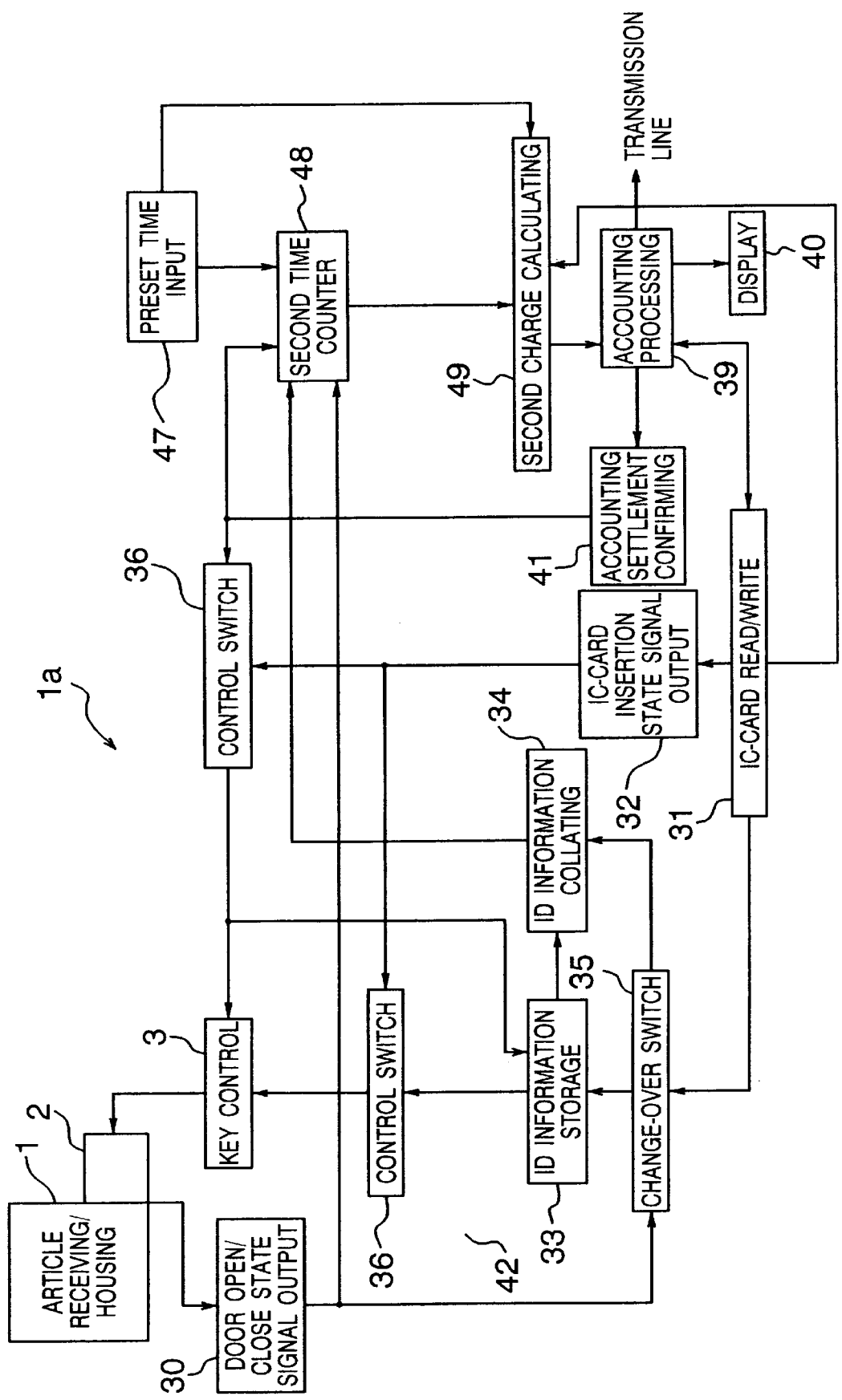
FIG. 23 is a block diagram showing a further exemplary embodiment of the transaction-oriented electronic accommodation system according to the invention applied to an electronic parking meter system.
Figure 24:
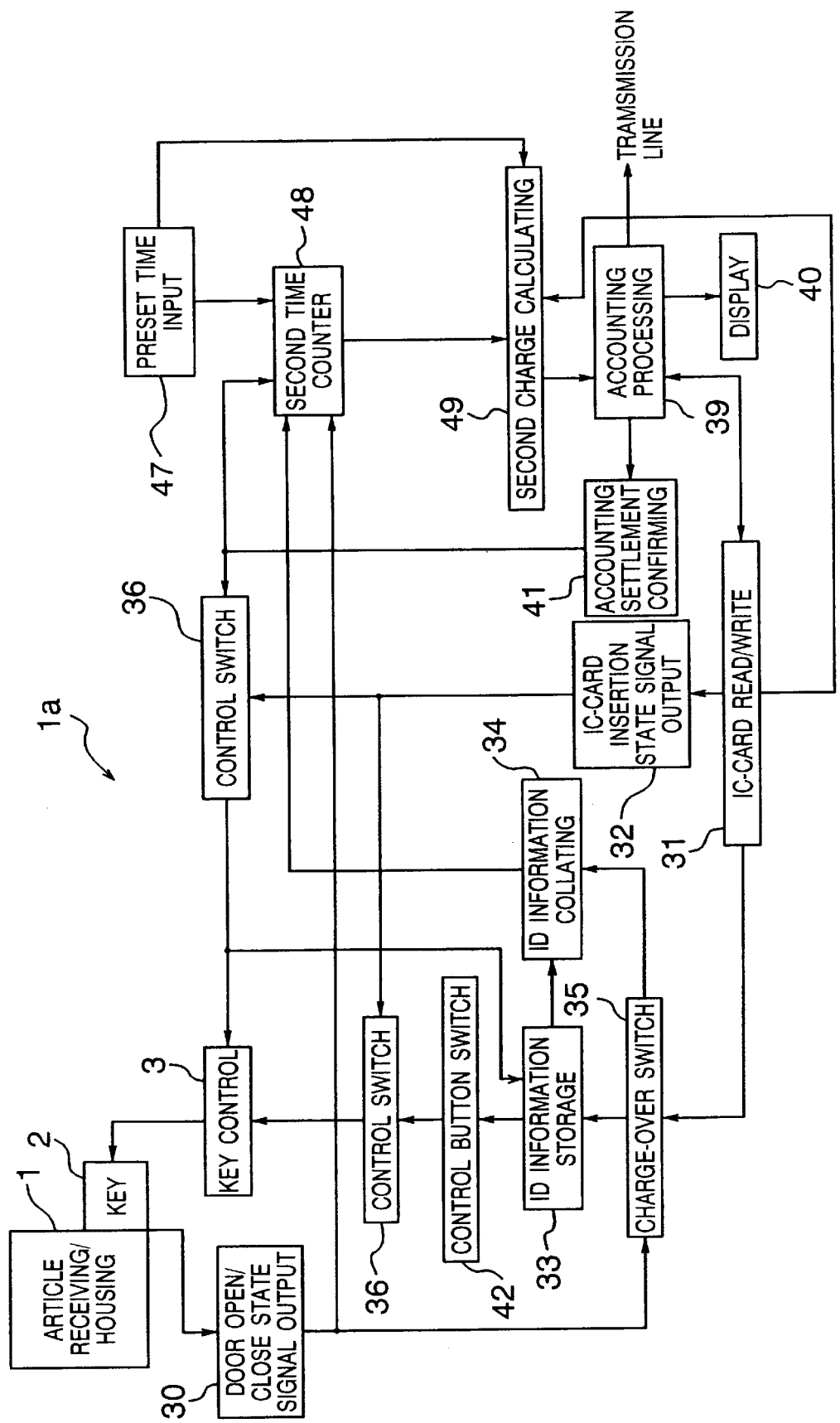
FIG. 24 is a block diagram showing yet further exemplary embodiment of the transaction-oriented electronic accommodation system according to the invention applied to an electronic parking meter system.
Figure 25:
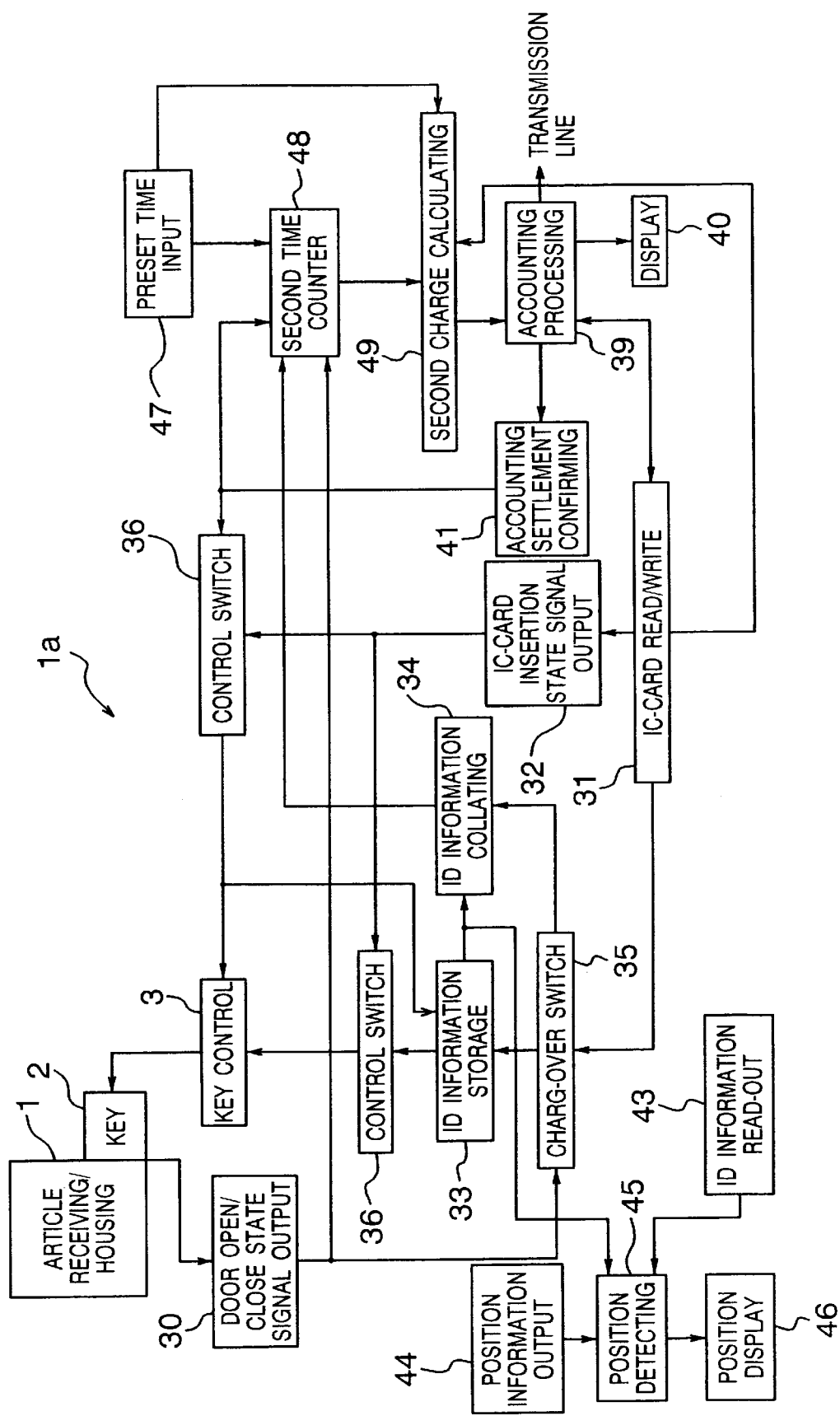
FIG. 25 is a block diagram showing still further exemplary embodiment of the transaction-oriented electronic accommodation system according to the invention applied to an electronic parking meter system.
Figure 26:
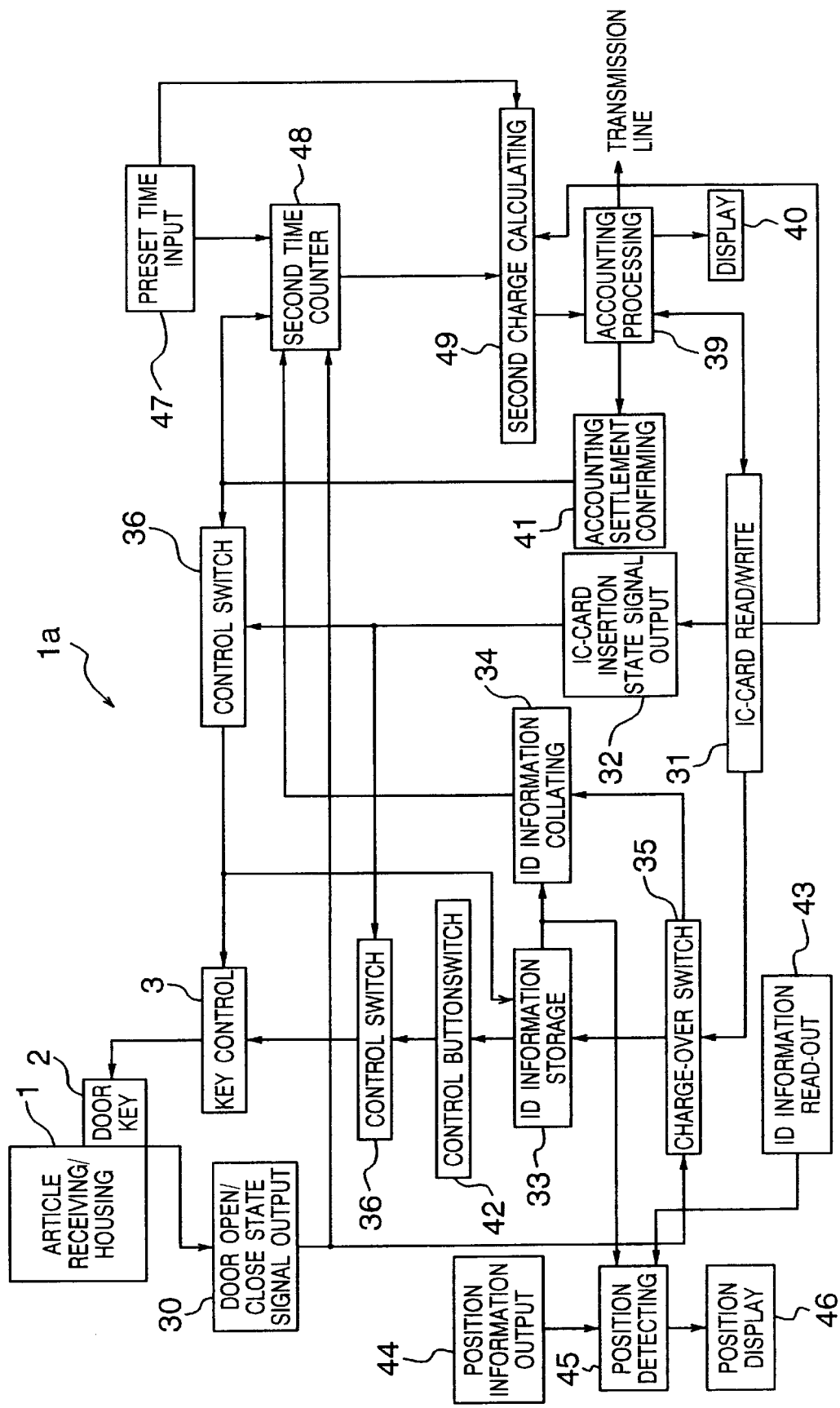
FIG. 26 block diagram showing a further exemplary embodiment of the transaction-oriented electronic accommodation system applied to an electronic parking meter system.

Moreover, the invention can find application to an electronic parking meter system equipped with a car blocking mechanism. More particularly, FIG. 19 is a block diagram of an electronic parking meter system to which the transaction-oriented electronic accommodation system according to the invention is applied. In FIG. 19, parts or components serving functions which are the same as or equivalent to those shown in FIG. 11, are denoted by like reference numerals and repeated description thereof are omitted. In this case, it is contemplated that a motor vehicle or car is to be covered by the concept of the term "article". The electronic parking meter system further includes a second charge calculating unit 49 for calculating an amount of money to be charged for the parking (hereinafter referred to as the parking charge) on the basis of the information about the time measured by the first time counter 37 and a discount information read out from the IC card by the IC card read/write unit 31. Parenthetically, the key 2 is used in association with a car blocking or barrier mechanism.

Now, referring to FIG. 19, description will be made of functions newly added to the transaction-oriented electronic accommodation system for implementing the electronic parking meter system of concern. In parking zones (corresponding or equivalent to "article receiving/housing unit 1") such as those of department houses, large-scale stores and the like, the parking charge is frequently discounted in dependence on amounts of money spent in buying in the department house, etc. Thus, by writing information about the rate of discount in the IC card, the information is read out upon insertion of the IC card in the IC-card read/write unit 31 for unlocking the key 2, whereupon the information is outputted to the second charge calculating unit 49 which then calculates the charge on the basis of the discount rate information and the time measured by the first time counter 37. Other operations and processings performed by the electronic parking meter system are similar to those described hereinbefore in conjunction with the IC-card operated electronic locker system by reference to FIG. 11.

FIGS. 20 to 26 show other exemplary embodiments of the invention. It is believed that arrangements and operations of these illustrative systems can be understood from the drawings by taking into account the descriptions made by reference by FIGS. 11 to 18, without need for any further description.

Many features and advantages of the present invention are apparent from the detailed description, and thus it is intended by that the appended claims cover all such features and advantages of the system which fall within the true spirit and scope of the invention. Further, since numerous modifications and combinations will readily occur to those skilled in the art, it is not intended to limit the invention to the exact construction and operation illustrated and described herein.

By way of example, by using the IC card as keys for rooms of hotels, it is possible not only to identify users, but also to perform settlement-of-account information processing without a need for paying the charge in cash. Further, the transaction-oriented electronic accommodation system according to the invention can find applications at entrances of theaters, cinematograph theaters, concert halls, ticket barriers for transportation systems such as railways, automobiles, authorization for utilization of a set top box of a CATV or the like and accounting for the same, admission to recreation parks and use of facilities, such as ski chair lifts and so forth. In addition, the present invention can find application for home use. In that case, the accounting processing function may be spared. Additionally, the IC card can be used in place of a key for locking/unlocking a door while affording recording of the times for getting home, time for drop-in and others.

Furthermore, the electronic accommodation system has a refund function such as credit function so that after some amount of money was paid for the article through the IC card in case of over-payment, the control center will take in account a refund procedure and will proceed with a refund process for the IC card when the next services would be available. The refund may be carried out in the case where an accounting error occurs, and the like. Therefore, a receiver or user can also demand a refund through the transmission line to the control center. The term IC card used throughout the embodiments of the present disclosure means an IC card including a memory and/or a processor (or CPU).

Accordingly, all suitable modifications and equivalents may be resorted to, and should be considered as falling within the spirit and scope of the invention.

What is claimed is:

1. A key control apparatus using an IC card having stored information including electronic money and an identification number, comprising:

an IC card reader/writer which reads and writes the information of the IC card;

an electronic money processor which processes the electronic money of the information stored in the IC card;

an identification number storing unit which stores an identification number of the information stored in the IC card read by said IC card reader/writer;

a key controller which controls locking and unlocking of a key;

a collating unit which collates the identification number being stored in said identification number storing unit with an identification number read out from the IC card, wherein when locking the key, said IC card reader/writer reads the identification number of the information stored in the IC card;

said identification number storing unit stores the identification number;

said key controller locks the key, and when unlocking the key, said IC card reader/writer reads out the information of the identification number and electronic money in the IC card;

said collating unit compares the identification number of the IC card entered into said IC card reader/writer with the identification number stored in said identification number storing unit;

said electronic money processor subtracts the information of electronic money of the IC card when coinciding with the identification numbers; and said key controller unlocks the key after subtracting the information of electronic money.

2. A key control apparatus according to claim 1, wherein the identification number stored in said identification number storing unit is deleted after subtracting the electronic money information.

3. A key control apparatus according to claim 1, further comprising, a time measuring unit which measures a time after locking the key by said key controller, terminates the time measurement when coinciding the identification numbers, and causes said electronic money processor to calculate a charge in accordance with the measured time.

4. A key control apparatus according to claim 1, wherein a transaction is suspended at a time when a monetary deficiency is indicated by the electronic money information of the IC card in unlocking the key, and said key controller controls the make the key locked.

5. A key control apparatus according to claim 1, wherein said key control apparatus includes an electronic locker having an accommodation unit for accommodating an article.

6. A key control apparatus according to claim 5, wherein said electronic locker includes a plurality of accommodation units and a locating information output unit outputting locating information of the accommodation unit.

7. A key control apparatus according to claim 1, wherein said key control apparatus includes a parking meter installed in a parking lot.

8. A key control apparatus according to claim 7, wherein said electronic money processor calculates a parking charge in accordance with parking charge discount information stored in the IC card.

9. A key control apparatus using an IC card being stored information of electronic money and identification number, comprising:
- an IC card reader/writer which reads and writes the information of the IC card;
- an electronic money processor which processes the electronic money of the information stored in the IC card;
- an identification number storing unit which stores an identification number of the information stored in the IC card read by said IC card reader/writer;
- a key controller which controls locking and unlocking of a key,
- a collating unit which collates the identification number being stored in said identification number storing unit with an identification number read out from the IC card, wherein
- when locking the key, said IC card reader/writer reads out the information of identification number and electronic money in the IC card;
- said electronic money processor subtracts the electronic money information corresponding to a predetermined charge from the information in the IC card;
- said identification number storing unit stores the identification number after subtracting the electronic money information from that of the IC card;
- said key controller locks the key;
- when unlocking the key, said IC card reader/writer reads out the identification number of the IC card;
- said collating unit compares the identification number of the IC card entered into said IC card reader/writer with the identification number stored in said identification number storing unit; and
- said key controller unlocks the key when coinciding the identification numbers.

10. A key control apparatus according to claim 9, wherein the identification number stored in said identification number storing unit is deleted after unlocking the key of an accommodation unit.

11. A key control apparatus according to claim 10, wherein said key control apparatus includes an electronic locker having said accommodation unit.

12. A key control apparatus according to claim 11, wherein said electronic locker includes a plurality of accommodation units and a locating information output unit outputting locating information of the accommodation unit.

13. A key control apparatus according to claim 9, wherein said key control apparatus includes a parking meter installed in a parking lot.

14. A key control apparatus according to claim 13, wherein said electronic money processor calculates a parking charge in accordance with parking charge discount information stored in the IC card.

15. A key control apparatus using an IC card being stored information of electronic money and identification number, comprising:
- an IC card reader/writer which reads and writes the information of the IC card;
- an electronic money processor which processes the electronic money of the information stored in the IC card;
- an identification number storing unit which stores an identification number of the information stored in the IC card read by said IC card reader/writer;
- a key controller which controls locking and unlocking of a key;
- a collating unit which collates the identification number being stored in said identification number storing unit with an identification number read out from the IC card, wherein
- when locking the key, said IC card reader/writer reads out the information of identification number and electronic money in the IC card;
- said electronic money processor subtracts the electronic money information corresponding to a predetermined charge from the information in the IC card;
- said identification number storing unit stores the identification number after subtracting the electronic money information from the IC card, said key controller locks the key;
- when unlocking the key, said IC card reader/writer reads out the information of the identification number and the electronic money in the IC card;
- said collating unit compares the identification number of the IC card entered into said IC card reader/writer with the identification number stored in said identification number storing unit;
- said electronic money processor subtracts the electronic money information of the IC card when coinciding the identification numbers; and
- said key controller unlocks the key after subtracting the electronic money information.

16. A key control apparatus according to claim 15, further comprising, a time measuring unit which measures a time after locking the key by said key controller, terminates the time measurement when coinciding the identification numbers, and causes said electronic money processor to calculate a charge in accordance with the measured time.

17. A key control apparatus according to claim 15, wherein a transaction is suspended at a time when a monetary deficiency is indicated by the electronic money information of the inserted IC card calculated by said electronic money processor in unlocking the key, and said key controller controls to make the key locked.

18. A key control apparatus according to claim 15, wherein said key control apparatus includes an electronic locker having an accommodation unit.

19. A key control apparatus according to claim 15, wherein said electronic locker includes a plurality of accommodation units and a locating information output unit outputting locating information of the accommodation unit.

20. A key control apparatus according to claim 15, wherein said key control apparatus includes a parking meter installed in a parking lot.

21. A key control apparatus according to claim 20, wherein said electronic money processor calculates a parking charge in accordance with parking charge discount information stored in the IC card.

\* \* \* \* \*